United States Patent
Khambati et al.

(10) Patent No.: US 11,181,380 B2
(45) Date of Patent: Nov. 23, 2021

(54) SELF-STABILIZING PLATFORM ASSEMBLIES

(71) Applicant: INTERNATIONAL BUSINESS MACHINES CORPORATION, Armonk, NY (US)

(72) Inventors: Suraush Khambati, Poughkeepsie, NY (US); Budy D. Notohardjono, Poughkeepsie, NY (US); Shawn M. Canfield, Poughkeepsie, NY (US); Richard M. Ecker, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 16/522,765

(22) Filed: Jul. 26, 2019

(65) Prior Publication Data

US 2021/0025714 A1 Jan. 28, 2021

(51) Int. Cl.
*G01C 21/18* (2006.01)
*F16F 15/31* (2006.01)
*G01C 19/02* (2006.01)

(52) U.S. Cl.
CPC ............ *G01C 21/18* (2013.01); *F16F 15/31* (2013.01); *G01C 19/02* (2013.01); *F16C 2361/55* (2013.01)

(58) Field of Classification Search
CPC ..... G01C 21/18; G01C 19/02; F16C 2361/55; F16F 15/30
See application file for complete search history.

(56) References Cited

U.S. PATENT DOCUMENTS 3,936,716 A * 2/1976 Bos .............. G01C 21/18
318/591
5,357,817 A * 10/1994 Weinberg ......... G01C 19/42
701/510

(Continued)

FOREIGN PATENT DOCUMENTS

CN 204197292 U 3/2015
CN 205891096 U 1/2017

(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Jeremy R Severson
(74) *Attorney, Agent, or Firm* — Tihon Poltavets, Esq.; Kevin P. Radigan, Esq.; Heslin Rothenberg Farley & Mesiti P.C.

(57) ABSTRACT

Product transport structures are provided which include a self-stabilizing platform assembly configured to support a product on a deck of the self-stabilizing platform assembly and to stabilize the product during moving of the self-stabilizing platform assembly and product. The self-stabilizing platform assembly includes multiple torque-generating devices and a stability control system. The multiple torque-generating devices are controllable to produce a stabilization torque within the self-stabilizing platform assembly, and the stability control system is configured to control operation of the multiple torque-generating devices. The stability control system is configured to adjust operation of one or more torque-generating devices of the multiple devices to produce the stabilization torque to facilitate (Continued)

stabilizing the product during moving of the self-stabilizing platform assembly and product.

20 Claims, 26 Drawing Sheets

(56) References Cited

U.S. PATENT DOCUMENTS

| | | | |
|---|---|---|---|
| 6,360,838 | B1 | 3/2002 | Kulhavy |
| 6,973,847 | B2 | 12/2005 | Adams et al. |
| 8,447,538 | B2 | 5/2013 | Cebulski |
| 8,485,053 | B2 * | 7/2013 | Lee .................. G01C 19/26 |
| | | | 74/5.4 |
| 8,608,026 | B1 | 12/2013 | Temko et al. |
| 9,381,981 | B2 | 7/2016 | Chiesa |
| 2011/0231085 | A1 | 9/2011 | Kim et al. |
| 2013/0233100 | A1 | 2/2013 | Kim |
| 2017/0085291 | A1 | 3/2017 | Linkesch et al. |

FOREIGN PATENT DOCUMENTS

| | | |
|---|---|---|
| CN | 106466840 A | 3/2017 |
| DE | 29812449 U1 | 11/1998 |
| DK | 2547576 T3 | 9/2014 |
| EP | 1639314 A1 | 3/2006 |
| EP | 2888154 A1 | 7/2015 |

OTHER PUBLICATIONS

Gibiansky, Andrew, "Quadcopter Dynamics and Simulation", http://andrew.gibiansky.com/blog/physics/quadcopter-dynamics/, published Nov. 23, 2012 (18 pages).

Drones Magazine, "The Physics of Multirotor Drone Flight—The Drones Mag", http://www.thedronesmag.com/the-physics-of-multirotor-drone-flight/, published Jan. 29, 2016 (4 pages).

Liang, Oscar, "How to Choose Motor for Racing Drone and Quadcopter", https://oscarliang.com/quadcopter-motor-propeller/#torque, published Oct. 2016 (11 pages).

Allain, Rhett, "How Do Drones Fly? Physics, of Course!", Wired Magazine, https://www.com/2017/05/the-physics-of-drones/, published May 19, 2017 (4 pages).

Kadamatt, V., "How Quadcopters Work & Fly: An Intro to Multirotors—Droney Bee", Droney Bee Magazine, https://www.droneybee.com/how-quadcopters-work/, published May 26, 2017 (16 pages).

Corrigan, Fintan, "How a Quadcopter Works with Propellers and Motors Explained", Dronezon Magazine, https://www.dronezon.come/learn-about-drones-quadcopters/how-a-quadcopter-works-with-propellers-and-motors-direction-design-explained/, published Aug. 24, 2018 (10 pages).

Khambati et al, "Moving Product Using Self-Stabilizing Platform Assembly", U.S. Appl. No. 16/522,787, filed Jul. 26, 2019 (83 pages).

Khambati et al., "List of IBM Patents and/or Patent Applications Treated as Related", U.S. Appl. No. 16/522,765, filed Jul. 26, 2019, dated Jul. 26, 2019 (2 pages).

* cited by examiner

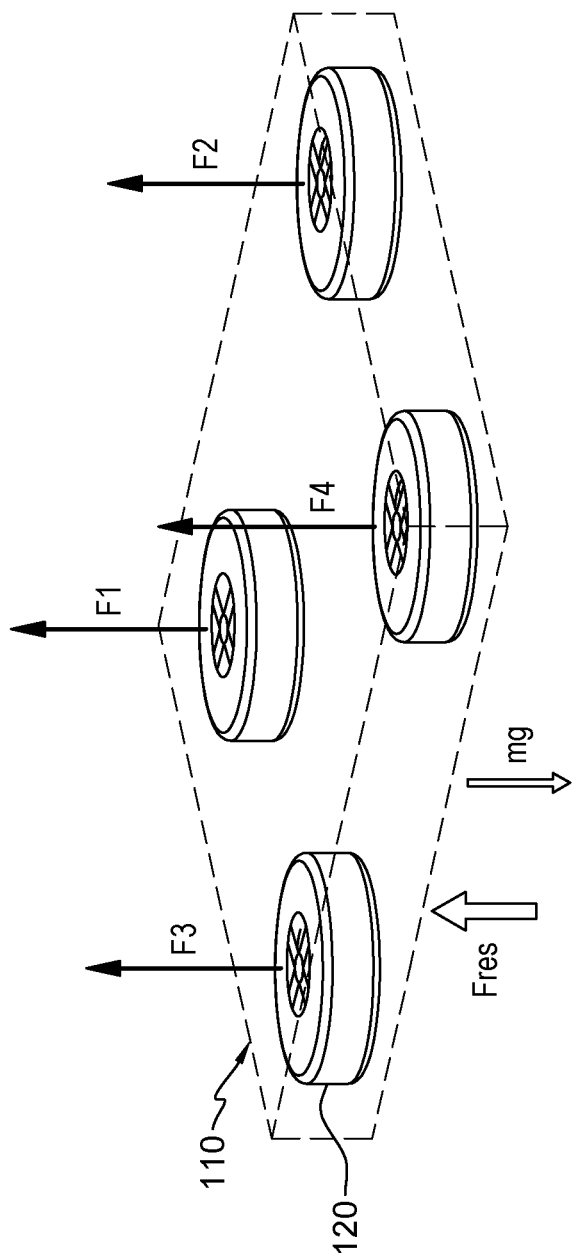

```
┌─────────────────────────────────────────────────────────────────────┐
│  ┌─────────────────────────────────────────────────────────────┐    │
│  │ WHERE THE ADJUSTING OPERATION OF THE ONE OR MORE            │    │
│  │ TORQUE-GENERATING DEVICES OF THE MULTIPLE TORQUE-GENERATING │    │
│  │ DEVICES INCLUDES INCREASING ROTATIONAL SPEED OF ONE OR MORE │    │
│  │ FLYWHEELS OF THE ONE OR MORE TORQUE-GENERATING DEVICES BASED,│~1214│
│  │ AT LEAST IN PART, ON THE SENSOR DATA OBTAINED, TO PRODUCE DURING│ │
│  │ THE STABILIZATION TORQUE WITHIN THE SELF-STABILIZING PLATFORM│   │
│  │ ASSEMBLY TO FACILITATE STABILIZING THE SELF-STABILIZING PLATFORM│ │
│  │ ASSEMBLY DURING THE MOVING OF THE SELF-STABILIZING PLATFORM │    │
│  │ ASSEMBLY AND PRODUCT                                        │    │
│  └─────────────────────────────────────────────────────────────┘    │
│                                  │                                   │
│  ┌─────────────────────────────────────────────────────────────┐    │
│  │ WHERE THE DECK OF THE SELF-STABILIZING PLATFORM ASSEMBLY IS │    │
│  │ RECTANGULAR-SHAPED, AND THE MULTIPLE TORQUE-GENERATING DEVICES│  │
│  │ INCLUDE FOUR TORQUE-GENERATING DEVICES, EACH TORQUE-GENERATING│  │
│  │ DEVICE OF THE FOUR TORQUE-GENERATING DEVICES BEING DISPOSED │    │
│  │ CLOSEST TO A RESPECTIVE CORNER OF THE RECTANGULAR-SHAPED DECK│~1216│
│  │ OF THE SELF-STABILIZING PLATFORM ASSEMBLY, AND WHERE THE METHOD│ │
│  │ FURTHER INCLUDES ROTATING, BY THE STABILITY CONTROL SYSTEM, TWO│ │
│  │ OF THE FLYWHEELS DISPOSED DIAGONALLY IN THE SELF-STABILIZING│    │
│  │ PLATFORM ASSEMBLY BELOW THE DECK CLOCKWISE, AND ROTATING TWO│    │
│  │ OTHER OF THE FLYWHEELS DISPOSED DIAGONALLY IN THE SELF-STABILIZING│ │
│  │ PLATFORM ASSEMBLY BELOW THE DECK COUNTER-CLOCKWISE          │    │
│  └─────────────────────────────────────────────────────────────┘    │
│                                  │                                   │
│  ┌─────────────────────────────────────────────────────────────┐    │
│  │ WHERE AT LEAST ONE SENSOR OF THE ONE OR MORE SENSORS IS     │~1218│
│  │ ASSOCIATED WITH THE SELF-STABILIZING PLATFORM ASSEMBLY      │    │
│  └─────────────────────────────────────────────────────────────┘    │
│                                  │                                   │
│  ┌─────────────────────────────────────────────────────────────┐    │
│  │ WHERE THE MOVING IS VIA A VEHICLE MOVING THE SELF-STABILIZING│   │
│  │ PLATFORM ASSEMBLY AND PRODUCT, AND THE MONITORING FURTHER   │    │
│  │ INCLUDES MONITORING FOR ONE OR MORE EVENTS RELATED TO A     │~1220│
│  │ POTENTIAL TILTING OF THE SELF-STABILIZING PLATFORM ASSEMBLY, OR│ │
│  │ RELATED TO CONTINUED OPERATION OF THE SELF-STABILIZING PLATFORM│ │
│  │ ASSEMBLY                                                    │    │
│  └─────────────────────────────────────────────────────────────┘    │
│                                  │                                   │
│  ┌─────────────────────────────────────────────────────────────┐    │
│  │ WHERE THE ONE OR MORE EVENTS ARE A STEERING ANGLE CHANGE OF THE│ │
│  │ VEHICLE, AN ACCELERATION CHANGE OF THE VEHICLE, A SPEED CHANGE OF│ │
│  │ THE VEHICLE, A BRAKING OF THE VEHICLE, A TEMPERATURE CHANGE OF A│ │
│  │ SURFACE TRAVERSED BY THE VEHICLE, A MOISTURE CHANGE OF THE  │    │
│  │ SURFACE TRAVERSED BY THE VEHICLE, A CHANGE IN CONDITION OF THE│~1222│
│  │ SURFACE TRAVERSED BY THE VEHICLE, A LOCATION OF THE VEHICLE │    │
│  │ IN A PRIOR PROBLEM AREA, AND/OR AN ABOVE-THRESHOLD RATE OF  │    │
│  │ DECREASE IN CHARGE POWERING OPERATION OF THE MULTIPLE       │    │
│  │ TORQUE-GENERATING DEVICES OF THE SELF-STABILIZING PLATFORM  │    │
│  │ ASSEMBLY                                                    │    │
│  └─────────────────────────────────────────────────────────────┘    │
└─────────────────────────────────────────────────────────────────────┘
```

1
SELF-STABILIZING PLATFORM ASSEMBLIES

BACKGROUND

Tip-over of an apparatus, such as a machine, rack, or other product, can result in bodily injury, as well as property damage. For instance, a computer rack, or palletized rack, or more generally, a product, can be susceptible to a tip-over incident when being moved or transported. Depending on the configuration, a computer rack, machine, or other product, can have a relatively high center of gravity, making the product more susceptible to tip-over during transport.

There are various events which can result in product tip-over. For instance, a palletized rack can tip due to the pallet being lifted by a fork-lift whose tines are not fitted into the pallet correctly, or by the fork-lift moving the product too quickly. Other potential causes of product tip-over in transport can include the vehicle moving the product traversing a rough terrain, or the vehicle being involved in an accident while moving the product. When a product being moved has a relatively high center of gravity, such as often the case with a computer rack, instability during moving of the product can increase likelihood of the product tipping over during transport.

SUMMARY

Certain shortcomings of the prior art are overcome and additional advantages are provided through the provision, in one or more aspects, of a product transport system which includes a self-stabilizing platform assembly configured to support a product on a deck of the self-stabilizing platform assembly and to stabilize the product during moving of the self-stabilizing platform assembly and product. The self-stabilizing platform assembly includes multiple torque-generating devices and a stability control system. The multiple torque-generating devices are controllable to produce a stabilization torque within the self-stabilizing platform assembly, and the stability control system is configured to control operation of the multiple torque-generating devices. The stability control system is configured to adjust operation of one or more torque-generating devices of the multiple torque-generating devices to produce in operation the stabilization torque to facilitate stabilizing the product during moving of the self-stabilizing platform assembly and product.

In another aspect, a method of fabricating a product transport system is provided. The method includes providing a self-stabilizing platform assembly configured to support a product on a deck of the self-stabilizing platform assembly and to stabilize the product during moving of the self-stabilizing platform assembly and product. Providing of the self-stabilizing platform assembly includes operatively positioning multiple torque-generating devices within the self-stabilizing platform assembly. The multiple torque-generating devices are controllable to produce a stabilization torque within the self-stabilizing platform assembly, and the method further includes providing a stability control system operatively coupled to control operation of the multiple torque-generating devices. The stability control system is configured to adjust operation of one or more torque-generating devices of the multiple torque-generating devices to produce in operation the stabilization torque to facilitate stabilizing the product during moving of the self-stabilizing platform assembly and product.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1D schematically represents one embodiment of a self-stabilizing platform assembly with multiple torque-generating devices configured and disposed to produce stabilization forces within the self-stabilizing platform assembly, in accordance with one or more aspects of the present invention;

FIGS. 12A-12C depict additional embodiments of processing, in accordance with one or more aspects of the present invention;

DETAILED DESCRIPTION

Figure 1A:
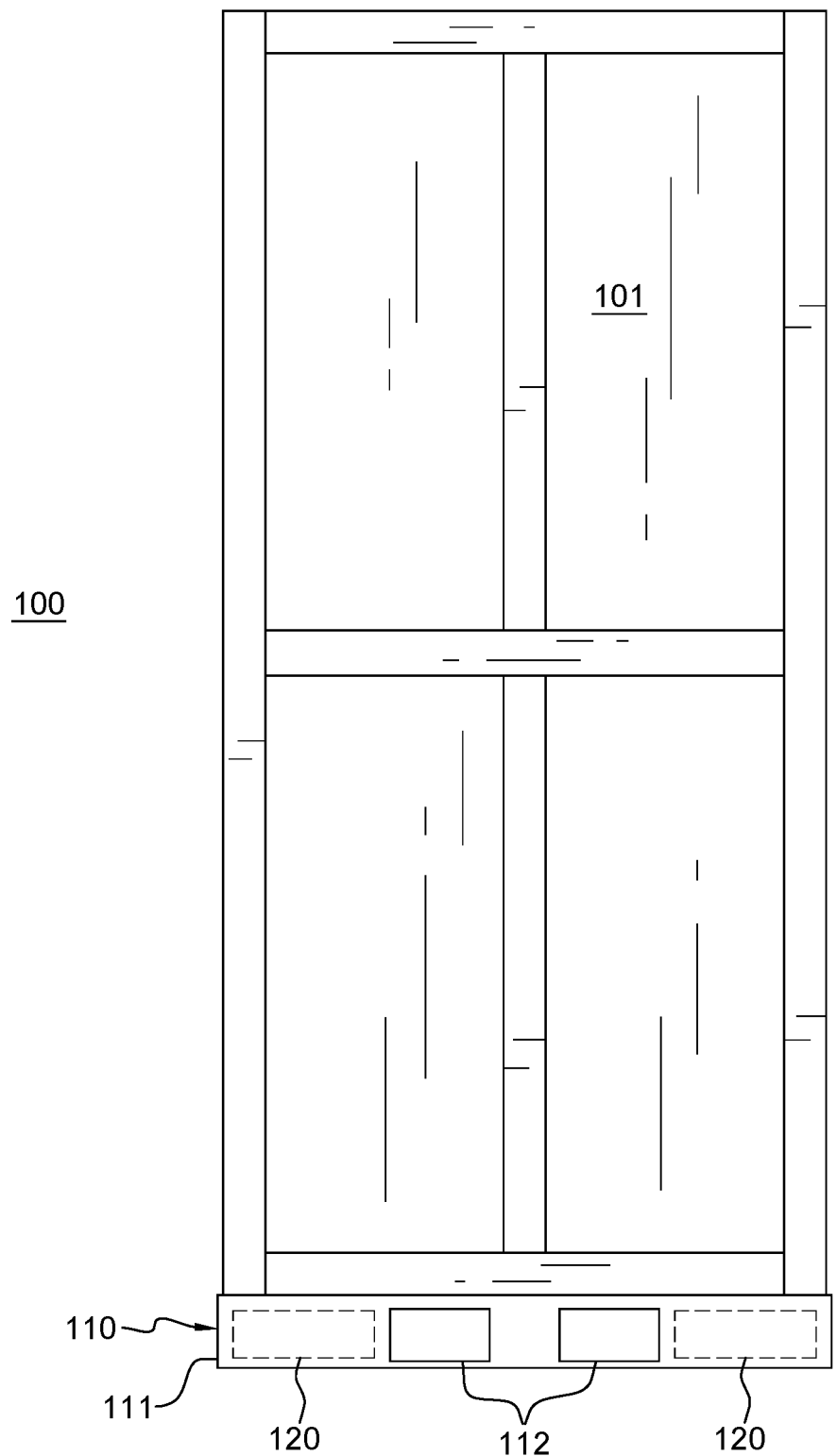
FIG. 1A depicts a crated product disposed on one embodiment of a self-stabilizing platform assembly configured to support and stabilize the product during transport, in accordance with one or more aspects of the present invention.

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular implementation of a product transport system and method, including a self-stabilizing platform assembly such as disclosed herein.

Note also that illustrative embodiments are described below using specific code, designs, architectures, protocols, layouts, schematics, or tools only as examples, and not by way of limitation. Furthermore, the illustrative embodiments may be described in certain instances using particular software, tools, and data processing environments only as example for clarity of description. The illustrative embodiments can be used in conjunction with other comparable or similarly purposed structures, systems, applications, architectures, etc. One or more aspects of an illustrative embodiment can be implemented in hardware, software, or a combination thereof.

Any advantages listed herein are only examples, and are not intended to be limiting to the illustrative embodiments. Additional or different advantages can be realized by specific illustrative embodiments. Furthermore, a particular illustrative embodiment can have some, all, or none of the advantages listed herein.

Note further that the term product is used herein to refer generally to any product, package, apparatus, machine, container, cabinet, rack, pallet, etc., that may benefit from being moved or transported on a self-stabilizing platform assembly, such as disclosed herein. As one example, the product can be a computer rack, which conventionally is of high value, relatively tall, and potentially top heavy, and therefore prone to tipping during transport or other movement, such as when being moved by a fork-lift or other transport vehicle. By way of example only, the product is described herein as being a computer rack to be moved from one location to another.

Products, including computer racks, are often transported in packages that can include, or reside on, a pallet. The pallet can have a bottom deck board, a top deck board, and sidewalls between the top and bottom deck boards. The boards and sidewalls of the pallet define a pallet interior into which tines of a fork-lift, pallet jack or other semi-manual vehicle can be inserted so that the pallet, package and computer rack inside the package can be lifted off the ground and moved. Since the pallet interior has to be large enough to accommodate various types of tines, it is often the case that the pallet interior is significantly larger than the tines. In such situations, there can be a large gap between the tines and the bottom deck board, which can lead to instability during a lift or turn operation. If this instability is excessive, the pallet, the package and/or the rack inside the package can tilt, and if the tilt becomes significant enough, product tip over can result, potentially causing damage to the rack and/or components within the computer rack, or even bodily injury if contacting an individual.

Other tip incidents can arise in other cases as well. For instance, a packaged product, or a product itself, could apparently be seated securely within a vehicle for transport. However, should the vehicle accelerate or brake suddenly, or make a sharp turn, the product might still tip over. Further examples include the possibility of a tip over event occurring during moving a product over an uneven or rough terrain.

Disclosed herein are product transport systems and methods which include platform assemblies configured to support and stabilize a product on the platform assembly during transport. By way of example, one or more platform assemblies include multiple torque-generating devices controllable to produce a stabilization torque within the platform assembly to self-stabilize the assembly, and a stability control system configured to control operation of the multiple torque-generating devices to produce when needed a stabilization torque. The stability control system is configured to adjust operation of one or more torque-generating devices of the multiple torque-generating devices to produce when needed a stabilization torque to facilitate stabilizing the product on a deck of the self-stabilizing platform assembly during moving or transport of the self-stabilizing platform assembly and product. Note that the term transport is used generally herein to refer to any movement of a product using a platform assembly, and includes moving, conveying, carrying, transferring, hauling, carting, shipping, or otherwise moving product from one place to another place. Transport of the platform assembly and product is by a vehicle, whether motorized, or not, such as by a cart, pallet jack, fork-lift, conveyor, truck, ship, airplane, etc.

In one or more embodiments, the moving is via a vehicle moving the self-stabilizing platform assembly and product, and the multiple torque-generating devices are disposed within the self-stabilizing platform assembly below the deck.

In one or more implementations, the self-stabilizing platform assembly includes a pallet, and the deck of the self-stabilizing platform assembly is a deck of the pallet.

In one or more embodiments, the multiple torque-generating devices include multiple flywheels, each flywheel being driven via a respective motor of multiple independently controllable motors, and the stability control system is configured to control rotational speed of each flywheel of the multiple flywheels via the multiple independently controllable motors.

In one or more embodiments, the stability control system is configured to adjust rotational speed of the multiple flywheels according to, in part, sensor data of one or more sensors associated with the self-stabilizing platform assembly or vehicle. Further, in one embodiment, the multiple flywheels are disposed within the pallet below the deck.

In one or more implementations, the deck of the self-stabilizing platform assembly is rectangular-shaped, and the multiple torque-generating devices include four torque-generating devices, each torque-generating device of the four torque-generating devices being disposed closest to a respective corner of the rectangular-shaped deck of the self-stabilizing platform assembly. In one or more embodiments, the four torque-generating devices include four flywheels, and in operation, two flywheels of the four flywheels disposed diagonally in the self-stabilizing platform assembly below the deck rotate clockwise, and two other flywheels of the four flywheels disposed diagonally in the self-stabilizing platform assembly below the deck rotate counter-clockwise.

In one or more embodiments, the self-stabilizing platform assembly includes a platform, where the pallet, with the product on the deck thereof, is supported, at least in part, by the platform during moving of the self-stabilizing platform assembly and product, and the multiple torque-generating devices are disposed within the platform.

In one or more embodiments, the multiple torque-generating devices within the platform include multiple flywheels, each flywheel being driven by a respective motor of multiple independently controllable motors, and the stability control system is configured to control rotational speed of each flywheel of the multiple flywheels via the multiple independently controllable motors. In one implementation, the stability control system is configured to adjust rotational speed of the multiple flywheels within the platform according to, in part, sensor data of one or more sensors associated with the self-stabilizing platform assembly or the vehicle.

In one or more implementations, the platform includes a rectangular-shaped platform, and the multiple torque-generating devices include four torque-generating devices, each torque-generating device of the four torque-generating devices being disposed closest to a respective corner of the rectangular-shaped platform of the self-stabilizing platform assembly. In one embodiment, the four torque-generating devices include four flywheels, and in operation, two flywheels of the four flywheels disposed diagonally in the platform below the deck rotate clockwise, and two other flywheels of the four flywheels disposed diagonally in the platform below the deck rotate counter-clockwise.

In one or more embodiments, the self-stabilizing platform assembly includes one or more sensors to provide the stability control system with sensor data to facilitate identifying a tilting of the self-stabilizing platform assembly. In one or more embodiments, the stability control system is configured to adjust operation of the one or more torque-generating devices of the multiple torque-generating devices based, at least in part, on the sensor data of the one or more sensors being indicative of the tilting of the self-stabilizing platform assembly to produce the stabilization torque to counter the tilting of the self-stabilizing platform assembly and product.

In one embodiment, the multiple torque-generating devices each produce a gyroscopic torque in operation, the gyroscopic torques being controlled by the stability control system to produce the stabilization torque based, at least in part, on sensor data of the one or more sensors associated with the self-stabilizing platform assembly or the vehicle.

Referring to the figures, FIG. 1A depicts one embodiment of an apparatus 100 including a product 101 disposed on (e.g., mounted to) a platform assembly or self-stabilizing platform assembly 110, in accordance with one or more aspects of the present invention. In the embodiment of FIG. 1A, self-stabilizing platform assembly 110 is configured as a pallet 111 with, for instance, appropriately sized openings 112 for a vehicle, such as a fork-lift, pallet jack, etc., to engage pallet 111 to assist in moving the palletized product from one location to another. Self-stabilizing platform assembly 110 is further configured to support and stabilize product 101 during transport, and includes multiple torque-generating devices 120 that are controllable to produce a stabilization torque within self-stabilizing platform assembly 110 when needed. As noted, product 101 is representative of any product, package, apparatus, machine, container, cabinet, rack, or other structure, etc., that can benefit from being coupled or mounted during transport to a self-stabilizing platform assembly, such as disclosed herein. By way of example only, the product can be a computer rack (such an information technology (IT) rack or server rack), which as noted, can be relatively tall, and potentially top-heavy, depending on the arrangement of components within the rack.

Figure 1B:
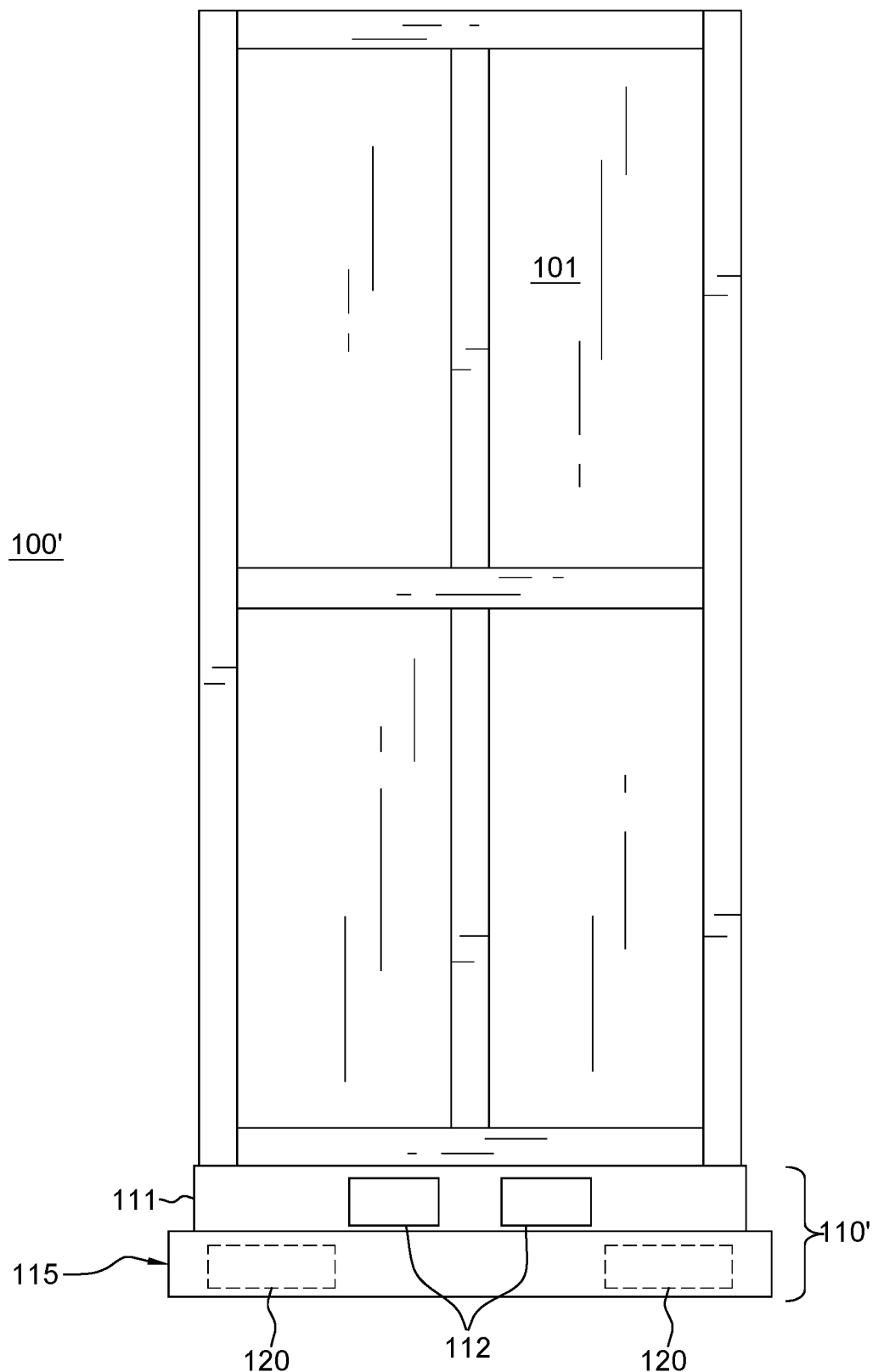
FIG. 1B depicts a crated product disposed on another embodiment of a self-stabilizing platform assembly configured to support and stabilize the product during transport, in accordance with one or more aspects of the present invention.

FIG. 1B depicts an alternate embodiment of an apparatus 100', including product 101 disposed on (e.g., mounted or coupled to) a self-stabilizing platform assembly 110', which includes pallet 111, with openings 112, as well as a platform 115 supporting pallet 111. As with the embodiment of FIG.

1A, self-stabilizing platform assembly 110' is configured to support and stabilize product 101 during transport by generating when appropriate a stabilization torque within the platform assembly. For instance, in the embodiment of FIG. 1B, platform 115 includes multiple torque-generating devices 120 disposed therein which are collectively controllable to produce a stabilization torque within the self-stabilizing platform assembly 110' when needed, such as disclosed herein.

By way of example, in one or more embodiments, torque-generating devices 120 can each include an appropriately sized and weighted flywheel, with the flywheels being controllably rotated to produce, when needed, the stabilization torque within the platform assembly so that the platform assembly is self-stabilizing based on occurrence, or predicted occurrence, of an event. In one or more other embodiments, torque-generating devices 120 could be, or include, gyroscopes, which can be disposed, for instance, within self-stabilizing platform assembly 110', with self-stabilizing platform assembly 110' being sized to accommodate appropriately sized gyroscopes to produce the counter-forces when needed.

Figure 1C:
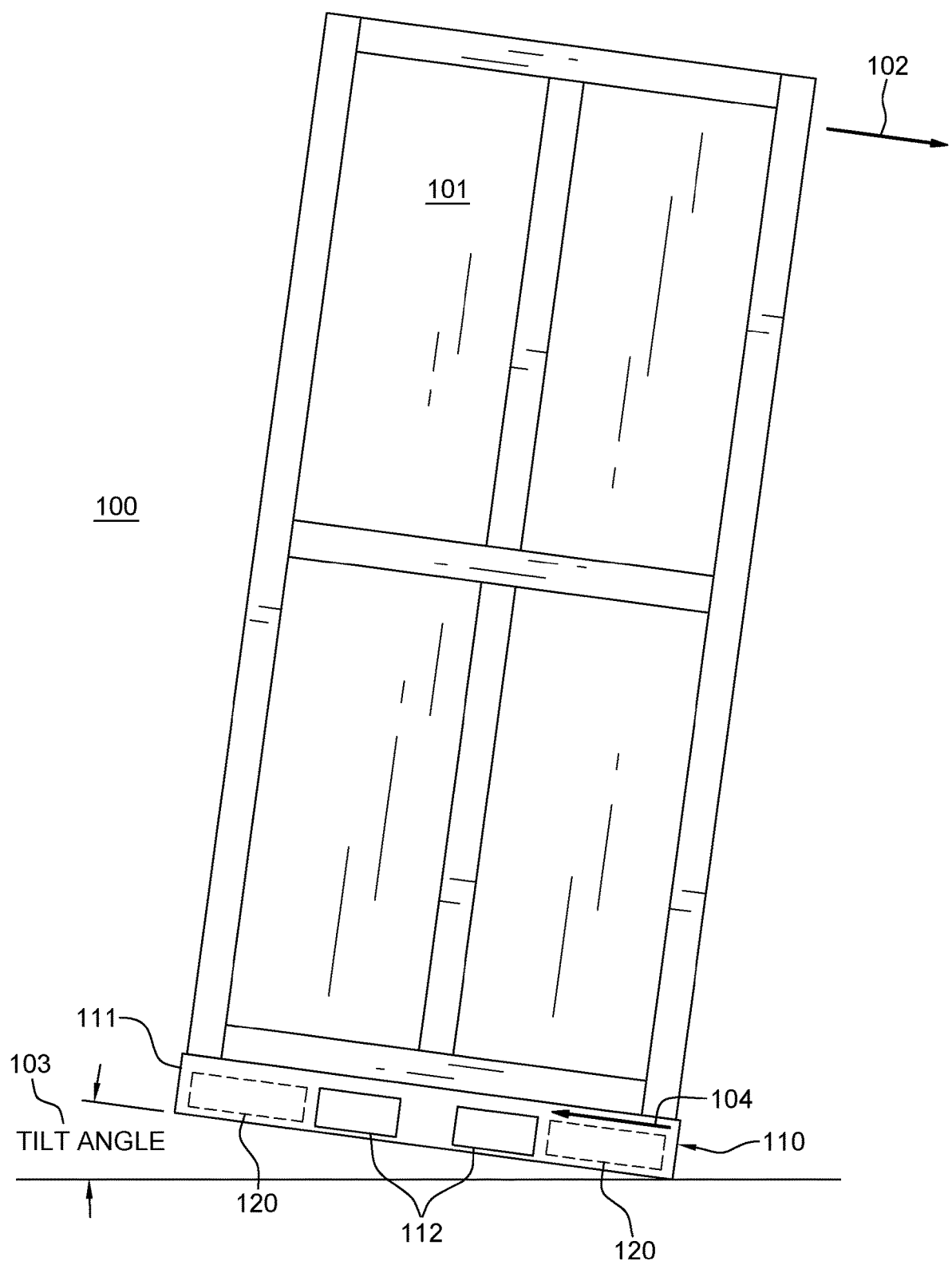
FIG. 1C depicts the product and assembly of FIG. 1A tilting sufficiently in one direction to produce a tilt angle, and depicting a counter-balancing torque being generated within the self-stabilizing platform assembly, in accordance with one or more aspects of the present invention.

By way of example, FIG. 1C depicts tilting of apparatus 100 (of FIG. 1A), including product 101 and self-stabilizing platform assembly 110 in a tilt direction 102 during transport. The tilting results in a tilt angle 103, which is detected by, for instance, one or more sensors associated with the self-stabilizing platform assembly and/or the vehicle moving the self-stabilizing platform assembly and product. Based on detecting the tilt angle, a counter-balancing torque 104 is generated within the platform assembly via control of the multiple torque-generating devices 120. The counter-balancing torque 104 is sized to provide a force sufficient to return apparatus 100 to a level position, thereby preventing tipping over of the apparatus.

FIG. 1D schematically illustrates multiple torque-generating devices 120 generating respective forces, in accordance with one or more aspects of the present invention. In particular, FIG. 1D is a schematic of one embodiment of a self-stabilizing platform assembly 110 including four torque-generating devices 120, with the resultant upward force (Fres) (equaling a summation of the forces (F1-F4) generated by the torque-generating devices 120), being offset by the weight (mg) of the palletized product (not shown). Those skilled in the art will understand from the description provided herein that a variety of flywheel diameters and weights can be employed to generate an appropriate thrust-per-flywheel for implementing a self-stabilizing platform assembly such as disclosed herein. In one or more embodiments, the size of the flywheels can depend on the particular weight and configuration of the product or products to be transported on the self-stabilizing platform assembly.

The responsiveness of a self-stabilizing platform assembly such as disclosed herein is determined, in part, by the thrust-to-weight ratio. In one implementation, the appropriate ratio can be ascertained by determining the maximum load to be carried by the platform assembly, and determining the responsiveness desired (i.e., the thrust-to-weight ratio desired). The thrust-to-weight ratio is divided among the number of flywheels required, which provides a thrust-per-flywheel, and then the size of the flywheel, both in diameter and weight, can be determined to generate the given thrust.

By way of example, at a thrust-to-weight ratio of 1.1, the supported product (not shown) will be able to be balanced, however, having a ratio of 1.3, or greater, can improve agility and/or responsiveness of the self-stabilizing platform assembly. For instance, for a computer rack with a weight of 2,400 lbs., a total thrust required could be 3,120 lbs., or 780 lbs. of thrust per torque-generating device 120. Where the torque-generating device is, for instance, a flywheel, a nominal flywheel diameter of, for instance, 15 inches with an appropriate weight, would suffice. This sized diameter flywheel can be incorporated into the pallet itself, as in the embodiment of FIG. 1A. In the embodiment of FIG. 1B, larger flywheel diameters of, for instance, 15-30 inches each, could be used within a larger platform footprint, that is, larger than the pallet footprint or product footprint. At a diameter of 30 inches, the thrust-per-flywheel would be increased to nearly 1,600 lbs., enabling a thrust-to-weight ratio of 2.5 or higher, which would improve responsiveness of the self-stabilizing platform assembly.

Figure 2A:
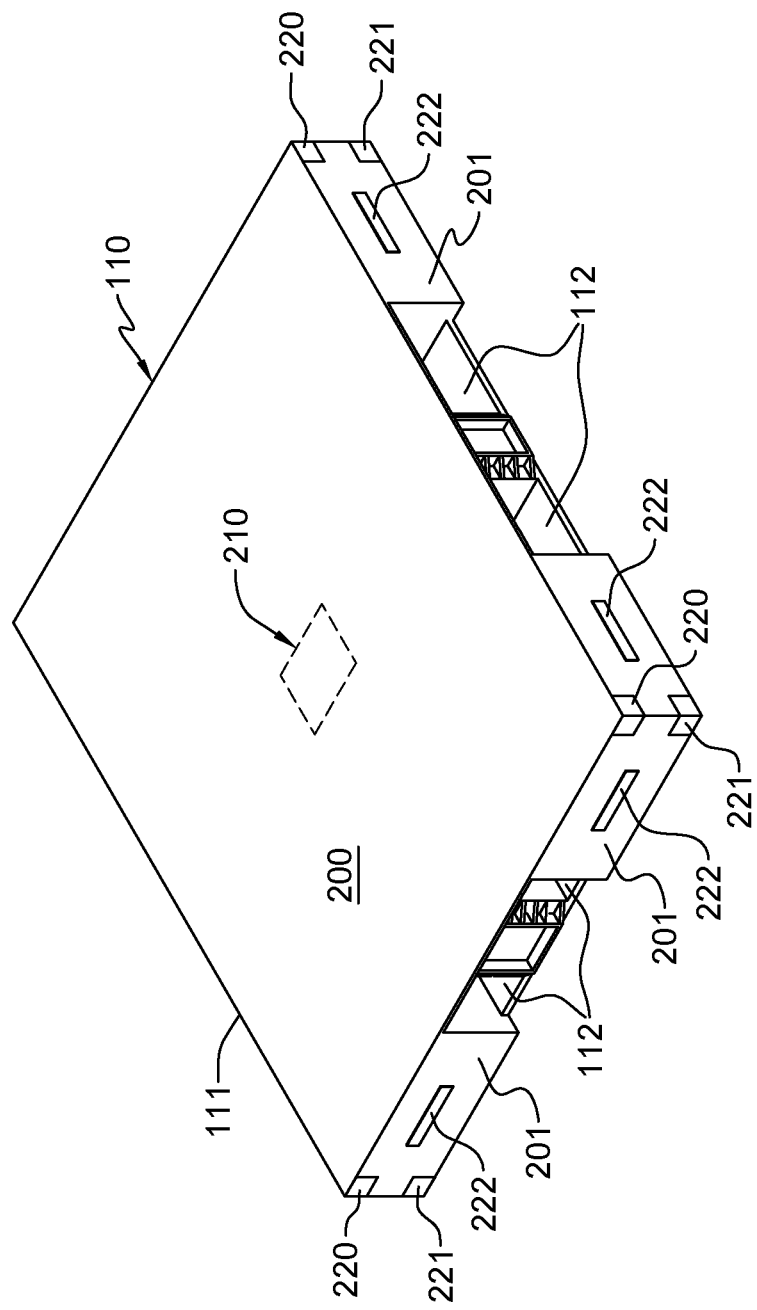
FIG. 2A depicts one embodiment of a self-stabilizing platform assembly configured to support and stabilize a product on a deck of the self-stabilizing platform assembly during transport, in accordance with one or more aspects of the present invention.
Figure 2B:
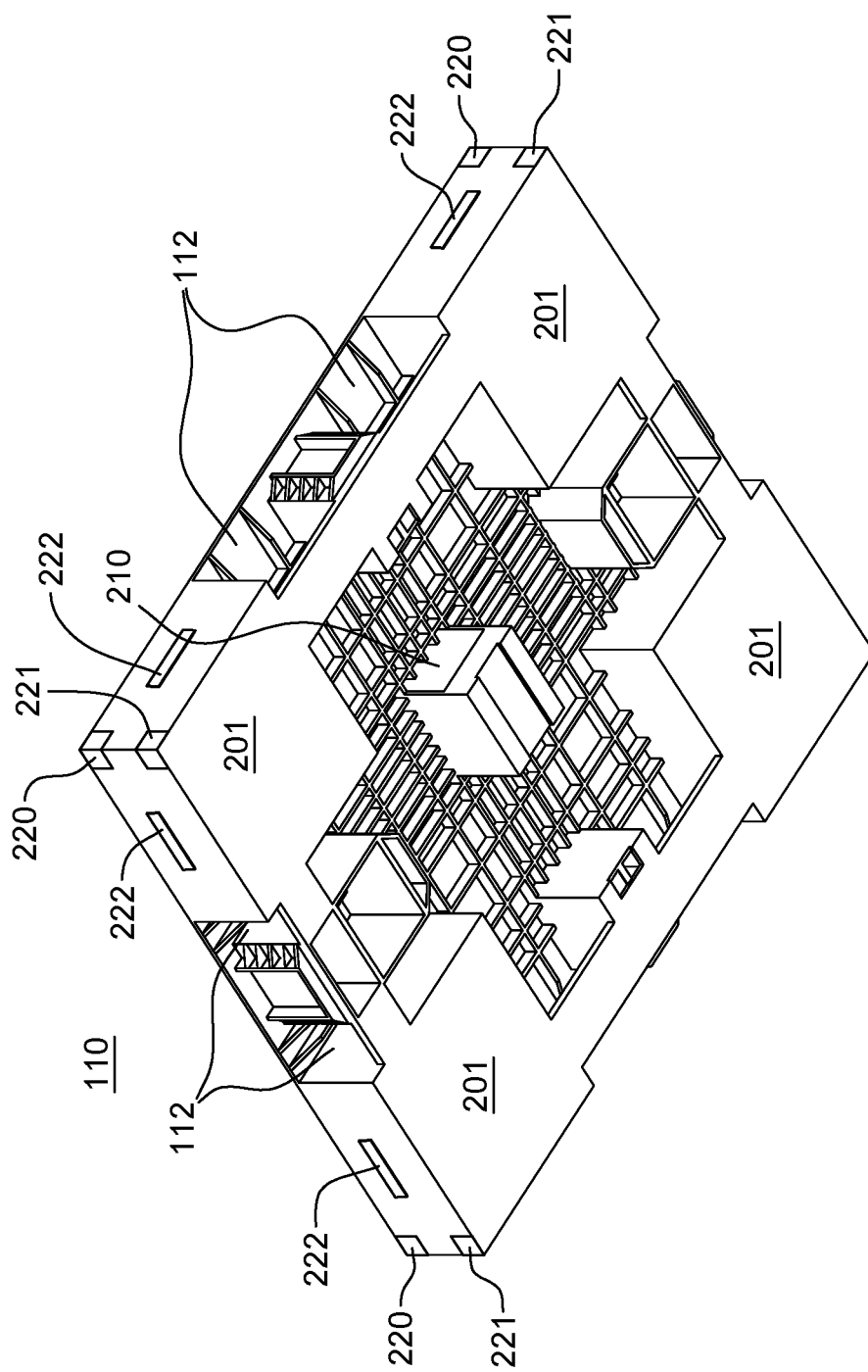
FIG. 2B is an under, side view of the self-stabilizing platform assembly embodiment of FIG. 2A, in accordance with one or more aspects of the present invention.
Figure 2C:
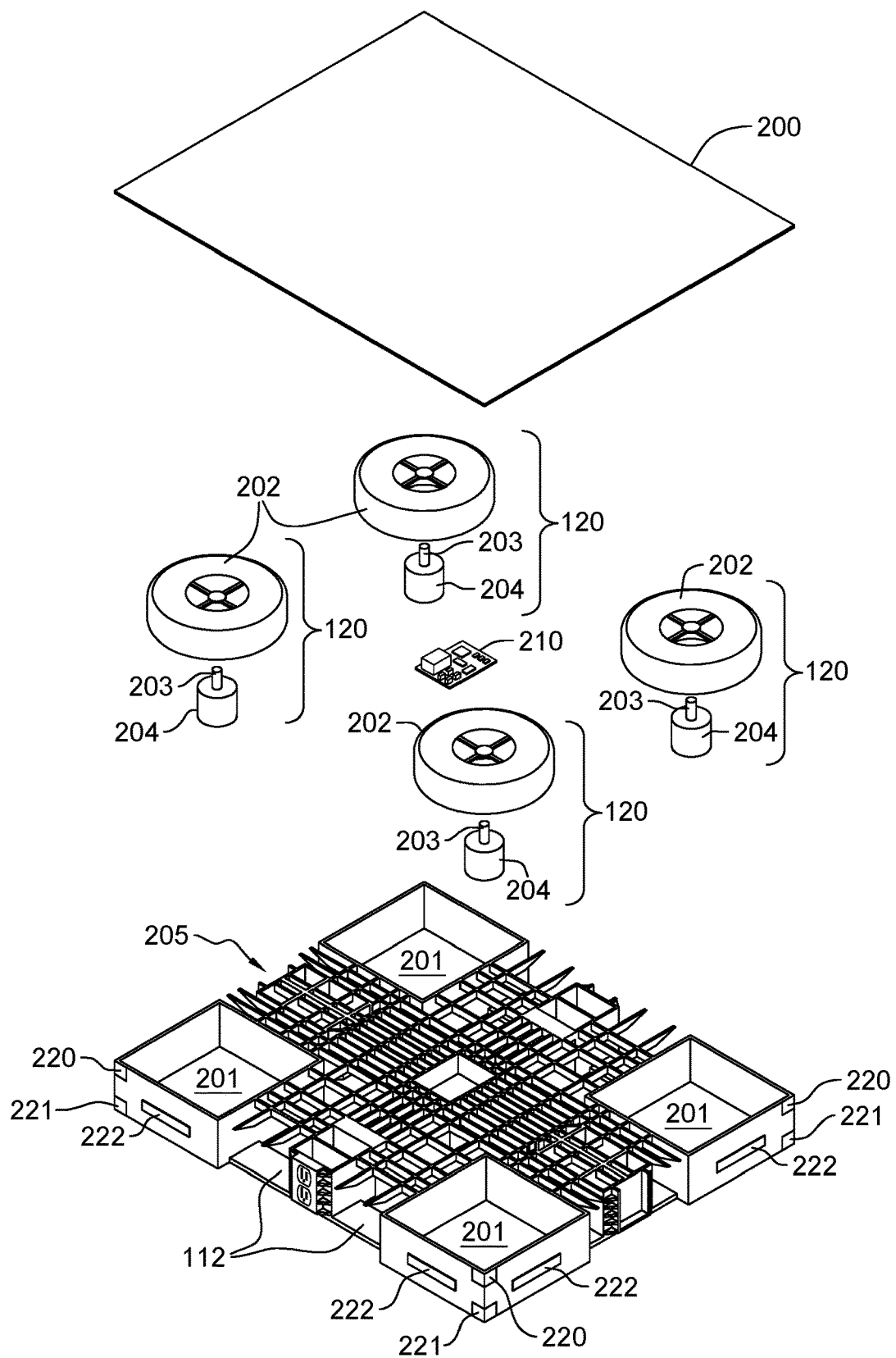
FIG. 2C is a partially exploded view of the self-stabilizing platform assembly embodiment of FIGS. 2A-2B, in accordance with one or more aspects of the present invention.

FIGS. 2A-2C depict one detailed embodiment of self-stabilizing platform assembly 110, by way of example only.

Referring collectively to FIGS. 2A-2C, self-stabilizing platform assembly 110 includes a pallet 111, with openings 112 and a deck 200. Pallet 111 and deck 200 are sized and configured to support a product, such as depicted in FIG. 1A, for transport. Multiple torque-generating device compartments 201 are provided within pallet 111. In one or more embodiments, each torque-generating device compartment 201 is a substantially sealed compartment accommodating a respective torque-generating device 120, such as a respective motor-driven flywheel.

As shown in the exploded view of FIG. 2C, each torque-generating device 120 includes, in one or more embodiments, a flywheel 202 coupled via a drive shaft 203 to an electric motor 204, such as a variable-speed motor, appropriately sized to controllably drive speed of rotation of the flywheel 202. In one or more embodiments, each flywheel 202 has a fixed axis of rotation along the motor drive shaft. Further in one or more embodiments, each flywheel 202 can be a solid structure of appropriate size and weight, or could include a flywheel casing with multiple components, such as spheres, disposed within the flywheel casing, and movable depending on the speed or rotation of flywheel 202.

In one or more embodiments, pallet 111 and/or deck 200 are rectangular-shaped, and four torque-generating devices 120 are provided within pallet 111, with each torque-generating device 120 being disposed within a respective torque-generating device compartment 201 at or adjacent to a respective corner of pallet 111 (in one embodiment).

Note that other configurations are possible depending, for instance, on the particular pallet or platform shape, as well as product to be moved. The rectangular-shaped pallet and platforms disclosed herein are provided by way of example only. Within a rectangular-shaped platform, or pallet, four torque-generating devices are also provided by way of example only. For instance, in other embodiments, more than four torque-generating devices could be employed. Further, note that in one or more embodiments, the torque-generating devices are similarly sized and configured. However, in one or more other embodiments, different torque-generating devices could be differently configured, for instance, have different sized flywheels for generating different amounts of thrust as desired, for instance, for a particular product being moved.

In one embodiment, deck 200 of platform 111 is removable from a base 205 of platform 111 to allow access to torque-generating device compartments 201. In other embodiments, deck 200 could be permanently affixed to base 205 of pallet 111, with the torque-generating device compartments 201 being accessed via appropriately sized panels or covers affixed to pallet 111, for instance, on the underside of base 205, to provide access to and allow sealing of torque-generating device compartments 201. Note that in one embodiment, torque-generating device compartments 201 are substantially sealed for protection, as well as to facilitate operation of the torque-generating devices 120 within the platform assembly.

In implementation, torque-generating devices 120 are controlled to produce gyroscopic torque(s) for enhancing stability of the platform assembly and product during transport of the product. In one or more embodiments, the motors 204 driving flywheels 202 can be externally powered, for instance, by plugging power supply circuitry of the self-stabilizing platform assembly into the vehicle moving the platform assembly and product, such as a fork-lift, jack-lift, or other transport vehicle. As described above, the flywheels, or other torque-generating devices, could be part of the pallet itself, or reside within a platform supporting a palletized product. For instance, the platform could be a bolt-on assembly that mounts under the pallet, such as depicted in FIG. 1B. Note in this regard that the torque-generating devices 120 in FIG. 1B within platform 115 supporting pallet 111 and product 101, could be similarly configured, powered and controlled as the torque-generating devices described herein with reference to the self-stabilizing platform assembly 110 embodiment of FIGS. 2A-2C.

In one or more embodiments, the balancing torque generated by the torque-generating devices is controlled by a stability control system 210, which can be or include (in one embodiment) an on-board stability control system (e.g., micro-controller) provided as part of self-stability platform assembly 110, which can include an electronic speed control (ESC) module. Further, in one or more embodiments, sensors can be provided as part of the platform assembly. For instance, the sensors can include accelerometers 220, 221 disposed at each corner of platform assembly, such as at upper and lower corners, and the stability control system can monitor for a change of velocity between the sensors indicative of tilting of the platform assembly. Additionally, one or more electronic levels 222 can be provided. For instance, in one embodiment, one or more electronic levels 222 are mounted on each side of the platform assembly to measure levelness of the platform assembly and product. These, or different sensors, could be included to provide sensor data to stability control system 210, which in turn dynamically uses the sensor data to determine whether a stabilization torque is needed within the self-stabilizing platform assembly to counter, for instance, a tilting of the platform assembly. For example, the stability control system implements, in one or more embodiments, stability control processing that detects a tilt, and based thereon, adjusts speed of rotation of one or more of the flywheels to provide the appropriate stabilization torque. The stabilization torque can continue to be provided until, for instance, the sensor(s) indicates that the self-stabilizing platform assembly and product are level.

Figure 3:
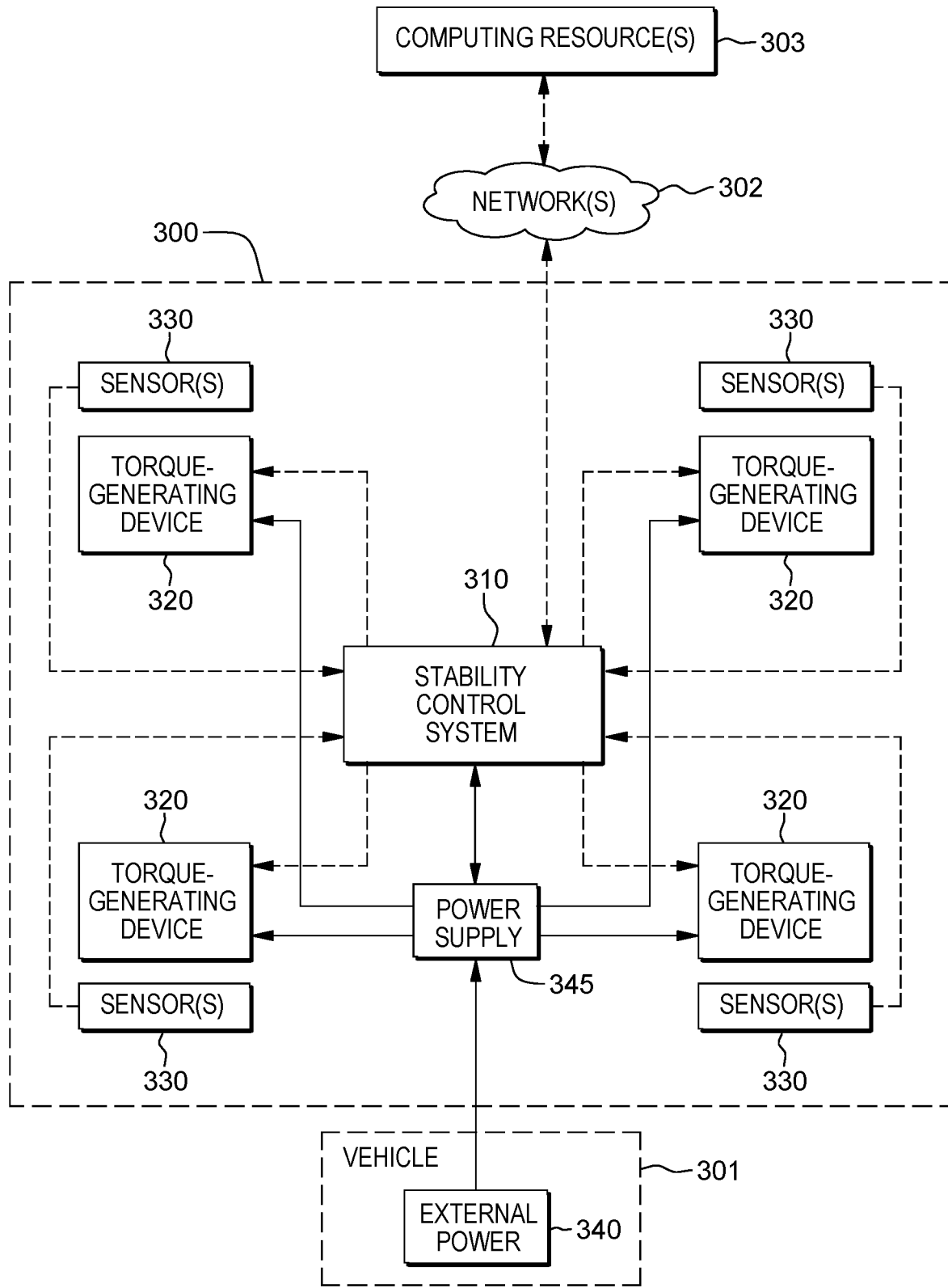
FIG. 3 is a block diagram of one embodiment of a product transport system including a self-stabilizing platform assembly, in accordance with one or more aspects of the present invention.

FIG. 3 is a schematic of a further embodiment of a self-stabilizing platform assembly 300, in accordance with one or more aspects of the present invention.

By way of example, self-stabilizing platform assembly 300 can be integrated as part of a pallet, or a platform supporting a pallet such as described above in connection with self-stabilizing platform assemblies 110, 110' discussed in connection with FIGS. 1A-2C. As described herein, self-stabilizing platform assembly 300 is used to facilitate stabilizing a product during moving of the product, such as within a warehouse, at a manufacturer's site, at a customer's site, or between geographic locations, such as from a manufacturer to a customer, etc. In the embodiment of FIG. 3, self-stabilizing platform assembly 300 is shown to include a stability control system 310, which controls operation of multiple torque-generating devices 320. By way of example only, self-stabilizing platform assembly 300 can be a rectangular-shaped platform assembly with a rectangular-shaped deck, with four torque-generating devices 320 being employed within the platform assembly below the deck. Self-stabilizing platform assembly 300 can further include one or more sensors 330, which provide sensor data from which stability control system 310 is configured to ascertain where there is an imbalance, tilt or change in level during moving of the self-stabilizing platform assembly. Based on the sensor data, stability control system 310 provides control signals to, for instance, adjust the speed of rotation of one or more flywheels associated with the torque-generating devices 320, such as described above in connection with the platform assembly of FIGS. 2A-2C (in one embodiment).

In operation, a vehicle 301 moves self-stabilizing platform assembly 300. In one embodiment, vehicle 301 provides external power 340, either directly to torque-generating devices 320, or through a platform assembly power supply 345, which distributes power to the individual torque-generating devices 320, dependent on the particular stabilization torque to be generated, as dynamically set by the stability control system 310. Note that in one or more other embodiments, power supply 345 could be a rechargeable power supply that is recharged as needed from an external power source, such as external power 345 associated with vehicle 301.

Further, note that, in one or more embodiments, one or more control aspects implemented by the stability control system 310 can be performed remotely by, for instance, a computing resource(s) 303 communicatively coupled as part of stability control system 310 via one or more networks 302. By way of example, network(s) 302 could be, for instance, a telecommunications network, a local area network (LAN), a wide area network (WAN), such as the Internet, or a combination thereof, and include wired, wireless, fiber optic connections, etc. The network(s) can include one or more wired and/or wireless networks that are capable of receiving and transmitting data, including stability control-related processing, such as discussed herein.

In one or more implementations, computing resource(s) 303 houses and/or executes one or more aspects of stability control processing, in accordance with aspects of the present invention. For instance, computing resource(s) 303 can be a server or other computing-system-implemented resource(s) that is, in one or more embodiments, separate from self-stabilizing platform assembly 300, as well as separate from vehicle 301, or have aspects thereof integrated, in whole or in part, into self-stabilizing platform assembly 300 and/or vehicle 301. For illustrative purposes only, computing resource(s) 303 is depicted in FIG. 3 as being separate from self-stabilizing platform assembly 300 and vehicle 301. This is a non-limiting example of an implementation. In one or more other implementations, computing resource(s) 303 on which aspects of stability control processing can execute can, at least in part, be located within stability control system 310 associated with self-stabilizing platform assembly 300 and/or within vehicle 301 moving self-stabilizing platform assembly 300. In one or more other implementations, computing resource(s) 303 could be, or include, cloud-based computing resources.

Briefly described, computing resource(s) 303 can include one or more processors, for instance, central processing units (CPUs). Also, the processor(s) can include functional components used in the execution of program code, such as functional components to fetch program code from locations such as cache or main memory, decode program code, and execute program code, access memory for instruction execution, and write results of the executed instructions or code. The processor(s) can also include a register(s) to be used by one or more of the functional components. In one or more embodiments, computing resource(s) 303 can include memory, input/output, a network interface, and storage, which can include and/or access one or more databases. The components of computing resource(s) 303 can be coupled to each other via one or more buses and/or other connections. Bus connections can be one or more of any of several types of bus structures, including a memory bus or a memory controller, a peripheral bus, and a processor or local bus, using any of a variety of bus architectures. By way of example, and not limitation, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Examples of computing resource(s) for a computer system which can implement one or more aspects disclosed herein are described further below with reference to FIGS. 13-15.

As operational examples, FIGS. 4A-4E illustrate functioning of a self-stabilizing platform assembly, such as the self-stabilizing platform assembly 110 of FIGS. 2A-2C.

Figure 4A:
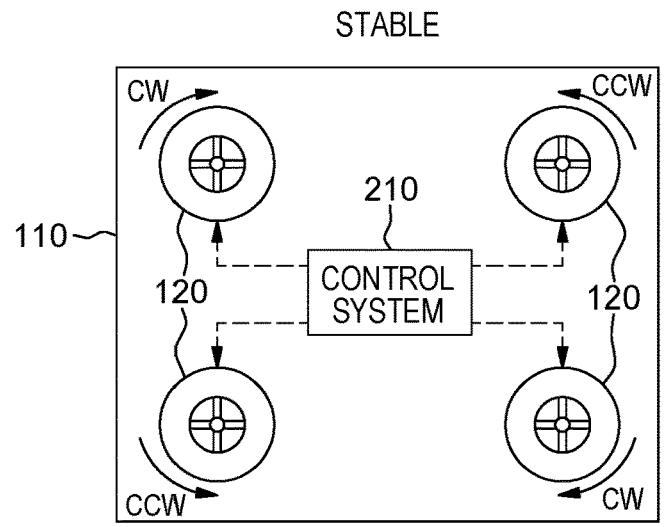
FIG. 4A depicts one embodiment of stable operation mode of a self-stabilizing platform assembly, in accordance with one or more aspects of the present invention.

Referring to FIG. 4A, four counter-rotating, torque-generating devices 120 are depicted in operation, with two flywheels of the four flywheels disposed diagonally in the self-stabilizing platform assembly 110 below the deck shown rotating clockwise (CW), and two other flywheels of the four flywheels disposed diagonally in the self-stabilizing platform assembly 110 below the deck shown rotating counter-clockwise (CCW). In the embodiment of FIG. 4A, self-stabilizing platform assembly 110 is assumed to be oriented level (or stable) during moving, and in that case, the stability control system 210 rotates the flywheels in an idle mode, where each flywheel is spinning at a substantially same, low rotational speed.

Figure 4B:
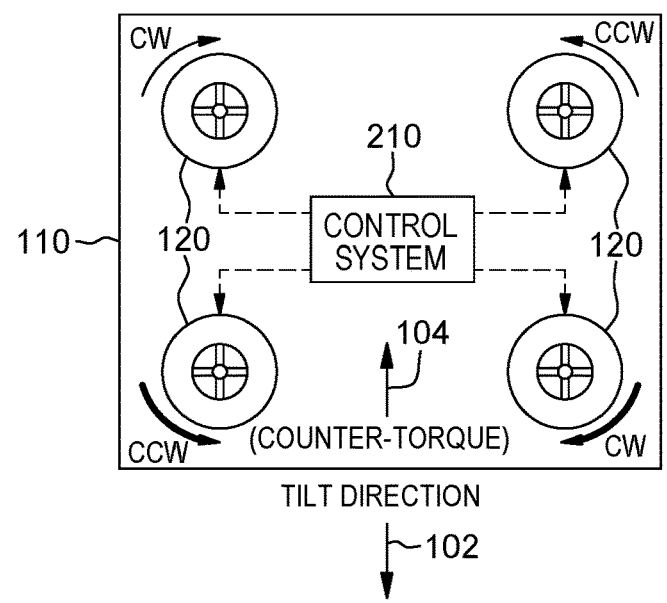
FIG. 4B depicts the self-stabilizing platform assembly of FIG. 4A, with a counter-torque being generated within the self-stabilizing platform assembly based on a tilting of the platform assembly in one direction, in accordance with one or more aspects of the present invention.

In FIG. 4B, a tilt is detected via sensor data obtained by stability control system 210. The tilt is identified as being in a tilt direction 102, and in response, the stability control system adjusts rotation of one or more flywheels to generate a counter-torque 104 to rebalance or level the self-stabilizing platform assembly 110. For instance, counter-torque 104 is generated, in one embodiment, by increasing speed of rotation of the two flywheels closest to the tilt direction 102.

Figure 4C:
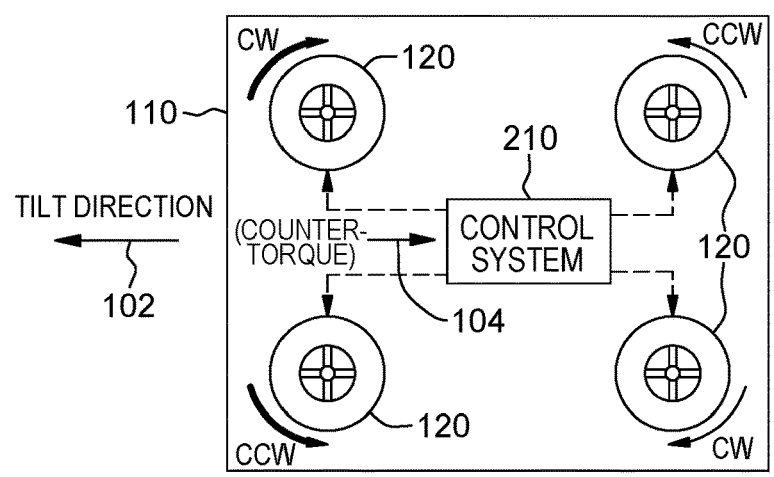
FIG. 4C depicts the self-stabilizing platform assembly of FIGS. 4A-4B, with a different counter-torque being generated within the self-stabilizing platform assembly based on a tilting of the platform assembly in a different direction, in accordance with one or more aspects of the present invention.

FIG. 4C depicts a similar operational example to that of FIG. 4B, with a different tilt direction 102, and different torque-generating devices being adjusted to produce the desired counter-torque 104 to balance or level the self-stabilizing platform assembly. Note that, depending on the direction of tilt, rotational speed of more, or less, than two flywheels can be adjusted.

Figure 4D:
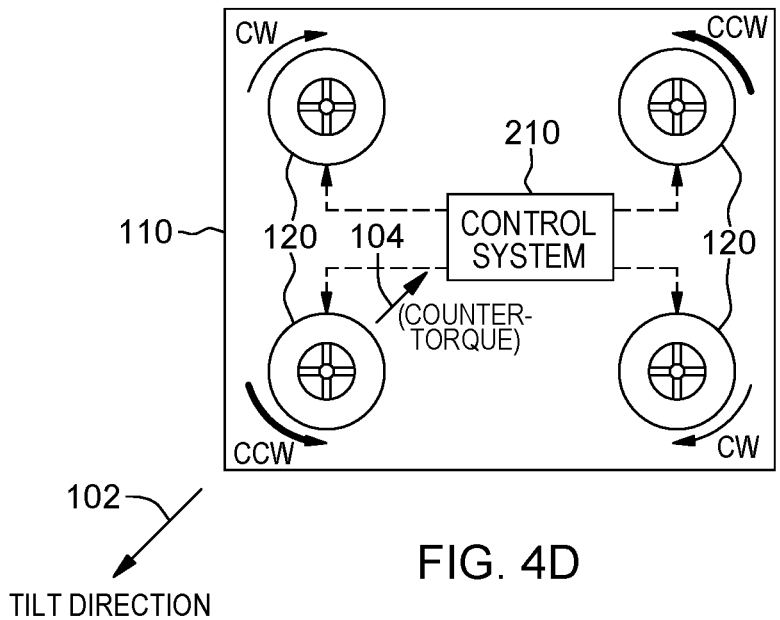
FIG. 4D depicts the self-stabilizing platform assembly of FIGS. 4A-4C, with another counter-torque being generated within the self-stabilizing platform assembly based on a tilting of the self-stabilizing platform assembly in a further direction, in accordance with one or more aspects of the present invention.
Figure 4E:
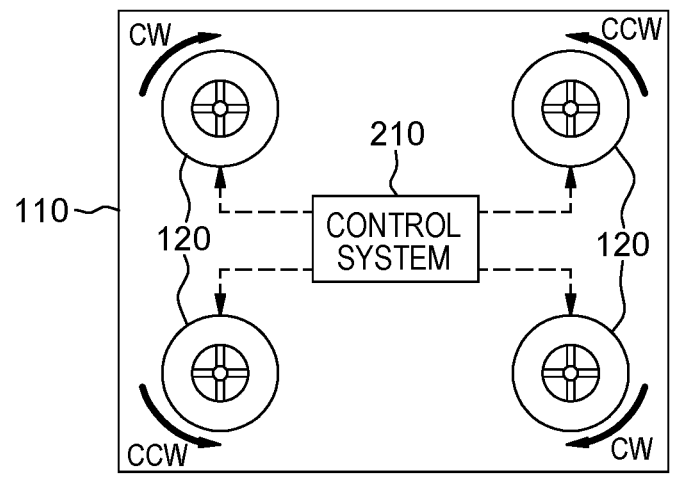
FIG. 4E depicts operation of the multiple torque-generating devices of the self-stabilizing platform assembly in an increased rotational speed mode based, for instance, on the self-stabilizing platform assembly being moved over a rough terrain, in accordance with one or more aspects of the present invention.

FIG. 4D depicts an operational example with another tilt direction 102. In this case, stability control system 210 increases rotational speed of two diagonally-disposed, torque-generating devices in order to produce the desired counter-torque 104. Those skilled in the art will understand from these examples that many possibilities exist for how the control system can be configured to adjust rotational speed of the flywheels of the torque-generating devices to produce a desired counter-torque to rebalance in operation the self-stabilizing platform assembly and product.

In a further example, where an operator, or the stability control system, identifies, for instance, that the self-stabilizing platform assembly is moving over, or is about to move over, a rough terrain, or other un-level surface, the control system can place the torque-generating devices into a high speed operational mode, or power mode, such as a max speed operational mode, where each flywheel is rotated, for instance, at a highest specified operational speed in order to provide enhanced stability of the self-stabilizing platform assembly as the self-stabilizing platform assembly and product are moved over the rough terrain. Depending on the implementation, and where sufficient power is available, the torque-generating devices of the self-stabilizing platform assembly could be operated in the high-speed operational mode for the full extent of moving the self-stabilizing platform assembly and product.

Figure 5A:
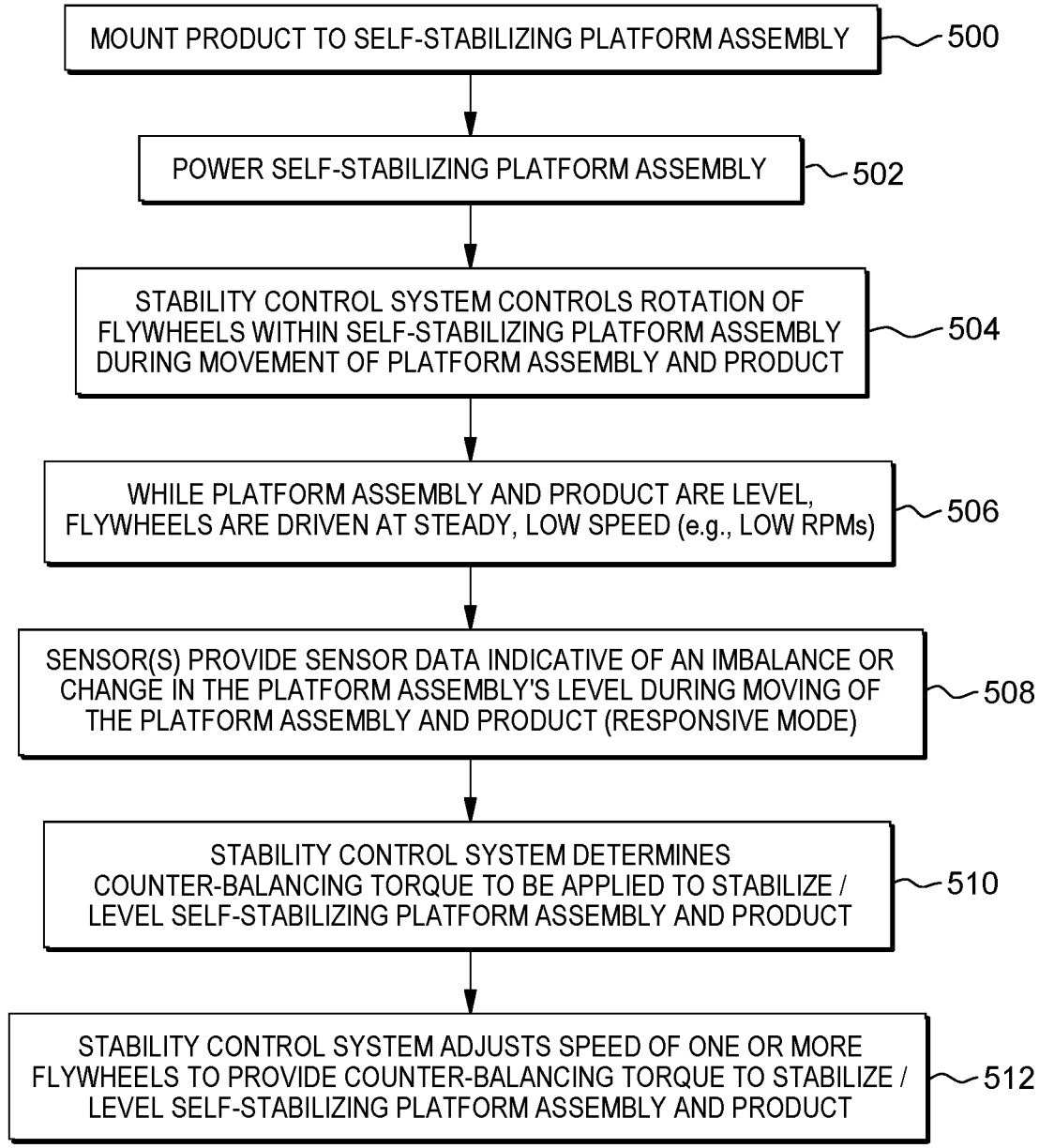
FIG. 5A depicts a process flow that illustrates certain aspects of some embodiments of the present invention.
Figure 5B:
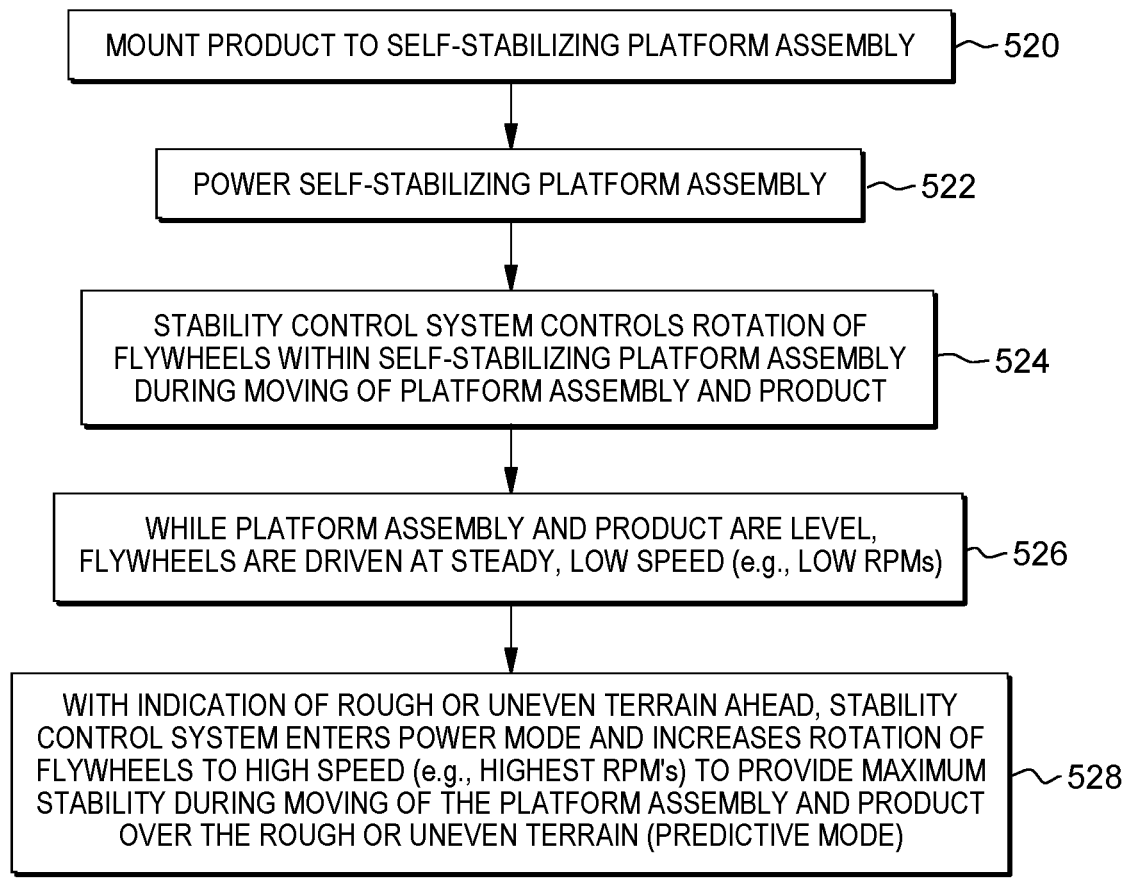
FIG. 5B depicts another process flow that illustrates certain aspects of some embodiments of the present invention.
Figure 5C:
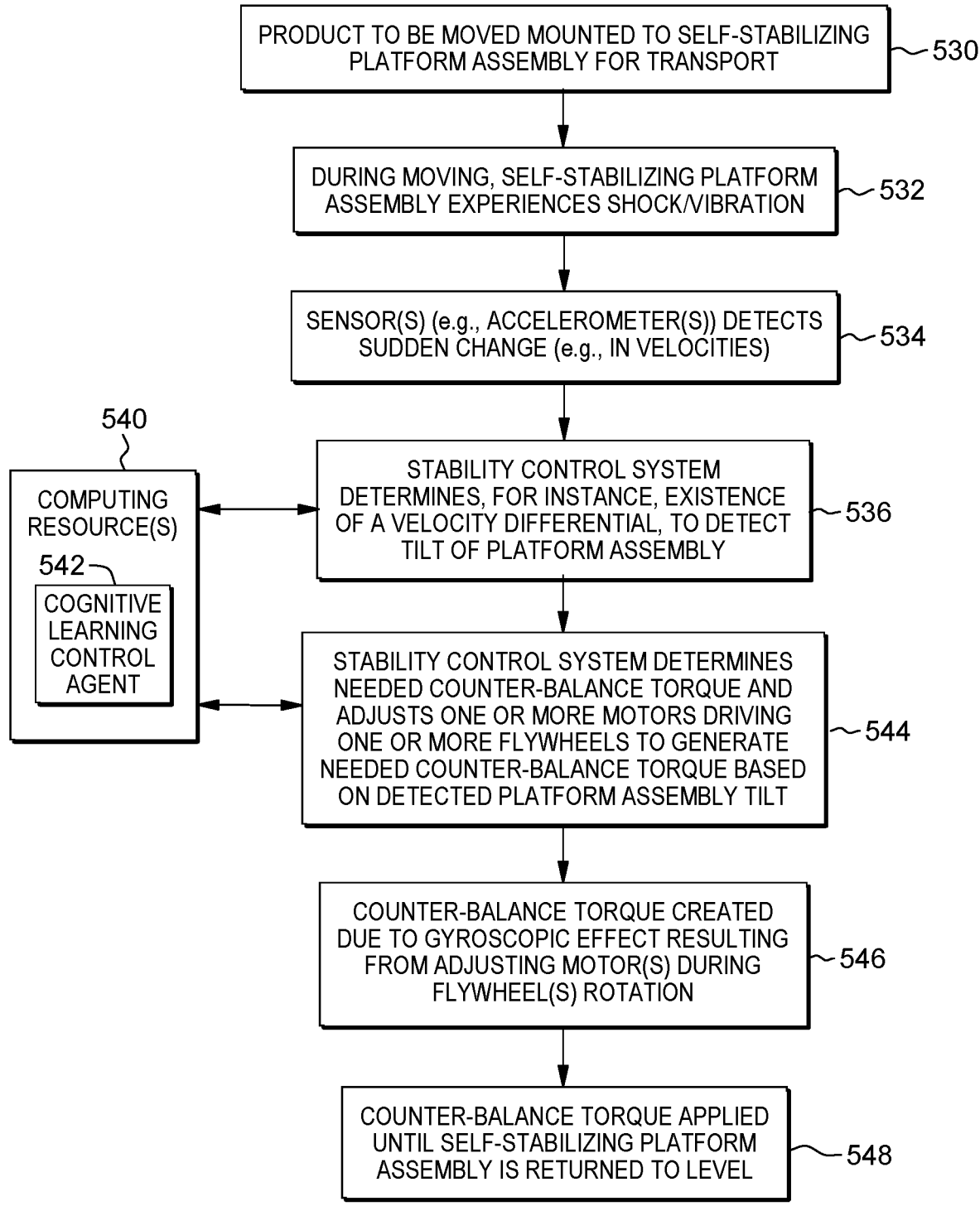
FIG. 5C depicts a further process flow that illustrates various aspects of some embodiments of the present invention.

By way of further example, FIGS. 5A-5C depict exemplary process flows that illustrate certain aspects of one or more embodiments of the present invention.

Referring to FIG. 5A, before transport, the product is, in one embodiment, mounted to (for example, bolted to or otherwise coupled to) the self-stabilizing platform assembly 500. For instance, in the embodiment of FIG. 1A, the packaged product is placed on and attached to pallet of the self-stabilizing platform assembly for transport, where the pallet includes the torque-generating devices and stability control system discussed herein. Alternatively, if integration of the torque-generating devices and stability control system into the pallet itself is not feasible, then the pallet, with the product coupled thereto, can be attached (e.g., bolted) to a platform of the self-stabilizing platform assembly, such as in the embodiment of FIG. 1B, discussed above.

Power is applied to the self-stabilizing platform assembly 502. For instance, the self-stabilizing platform assembly is powered, in one embodiment, by plugging the platform assembly into an external power, such as a power source of the vehicle intended to lift and transport the platform assembly and product.

In operation, the stability control system controls rotation of the flywheels within the self-stabilizing platform assembly during moving of the platform assembly and product 504. For instance, the stability control system, including, for instance, an electronic speed control (ESC) module disposed on board the self-stabilizing platform assembly, controls the operational speed of the individual flywheels housed within the self-stabilizing platform assembly. During transport, while the platform assembly and product are level, the flywheels can be driven in a steady, low-speed mode 506. For instance, in the steady, low-speed mode, the flywheels are rotated in a low-revolutions per minute (PRMs). In one or more other embodiments, the flywheels could be non-rotating in the idle mode, and only activated when an imbalance is detected, if desired. In one or more implementations, use of four torque-generating devices with, for instance, counter-rotating flywheels, assists in maximizing stabilization torque within a small footprint.

Operationally, one or more sensors can provide sensor data indicative of an imbalance, tilt or change in the platform assembly's levelness during movement of the product 508. As noted, the one or more sensors could be associated with, for instance, the self-stabilizing platform assembly itself, or the vehicle moving the self-stabilizing platform assembly and product.

The stability control system determines a counter-balancing torque to be applied to stabilize and/or level the self-stabilizing platform assembly and product 510. For instance, the stability control system processes sensor data to ascertain the particular direction and force required for the counter-balancing torque to be generated in order to stabilize, and hence level, the platform assembly.

The stability control system adjusts operation of the self-stabilizing platform assembly's flywheels to provide the desired counter-balancing torque to stabilize the self-stabilizing platform assembly and product by forcing the self-stabilizing platform assembly and product back towards level 512.

FIG. 5B depicts another exemplary process flow using a self-stabilizing platform assembly, in accordance with one or more aspects of the present invention.

Initially, product is disposed on (e.g., mounted to) a self-stabilizing platform assembly such as described herein 520. The self-stabilizing platform assembly is powered 522, for instance, by electrically connecting the self-stabilizing platform assembly to the vehicle moving the self-stabilizing platform assembly and product. Alternatively, in one or more other embodiments, the self-stabilizing platform assembly could include rechargeable batteries that power the platform assembly during moving of the self-stabilizing platform assembly and product, and which can be recharged when the platform assembly is not in use.

As noted, the stability control system of the self-stabilizing platform assembly controls rotation, in one embodiment, of one or more flywheels within the self-stabilizing platform assembly during movement of the platform assembly and product 524. While the platform assembly and product are level, the flywheels can be rotated at a steady, low speed in an idle or low-revolutions per minute (RPM) state 526.

In one embodiment, an indication of a rough or uneven terrain over which the vehicle is to traverse is obtained by the stability control system (such as described herein), and based on this indication, the stability control system dynamically places the torque-generating devices in the power mode by increasing rotational speed of one or more, or all, of the flywheels to a higher speed (e.g., to a highest or max specified RPMs) to provide maximum stability during moving of the platform assembly and product over the rough or uneven terrain 528. Note in this regard that the stability control system can, in one or more embodiments, increase rotational speed of the flywheels to the higher speed either a responsive mode, where the rough or uneven terrain is being sensed as the vehicle is moving, or in a predictive mode, where the stability control system predicts that the path being taken by the vehicle will traverse rough or uneven terrain, such as described further herein.

FIG. 5C depicts another exemplary process flow using a self-stabilizing platform assembly, in accordance with one or more aspects of the present invention.

Initially, the product to be moved is placed on, and optionally mounted to, a self-stabilizing platform assembly, such as described herein, for transport 530. Power to the self-stabilizing platform assembly is initiated, and during moving, the self-stabilizing platform assembly experiences a shock, vibration, etc., 532. One or more sensors (such as one or more accelerometers) associated with the self-stabilizing platform assembly and/or vehicle moving the platform assembly and product, detect a sudden change, such as a sudden change of velocity 534. The stability control system determines, for instance, existence of a velocity differential (in one embodiment) to detect a tilting of the platform assembly 536, and based thereon, the stability control system determines the needed counter-balance torque to balance the assembly, and based thereon, adjusts one or more motors driving one or more flywheels to generate the needed counter-balance torque 544.

As depicted, in one or more embodiments, one or more computing resources 540 hosting a cognitive learning control agent 542 can be utilized to assist with either, or both, detecting tilting of the platform assembly, and determining the counter-balancing torque and motor adjustments needed to counter-balance the detected platform assembly tilt. Further details of computing resource(s) 540 and cognitive learning control engine 542 are provided below in connection with the stability control system embodiment of FIGS. 6A-6C of a self-stabilizing platform assembly, such as described herein.

The counter-balance torque needed is created due to the gyroscopic effect resulting from adjusting the rotational drive of the appropriate motor(s) as, in one embodiment, the associated flywheel is rotating 546. In one embodiment, the counter-balancing torque is applied until the self-stabilizing platform assembly is detected to be level, such as within plus or minus a predetermined threshold of level 548. For instance, in one embodiment, the self-stabilizing platform assembly can determine level to be where the tilt angle of the moving platform assembly and product is less than or equal to +/−1 degree.

Figure 6A:
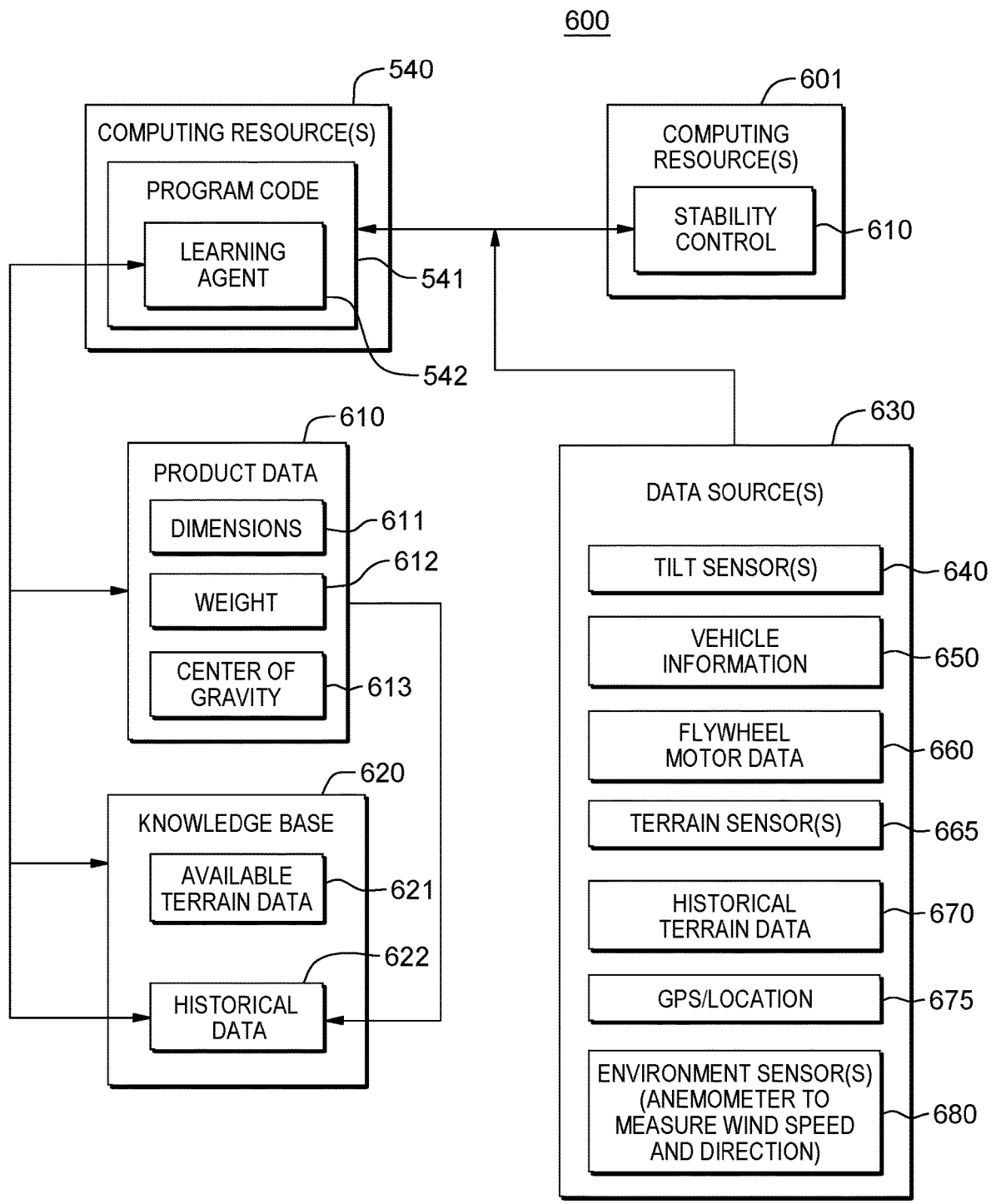
FIGS. 6A-6C illustrate a technical environment into which various aspects of a product transport system can be implemented, in accordance with one or more aspects of the present invention.
Figure 6B:
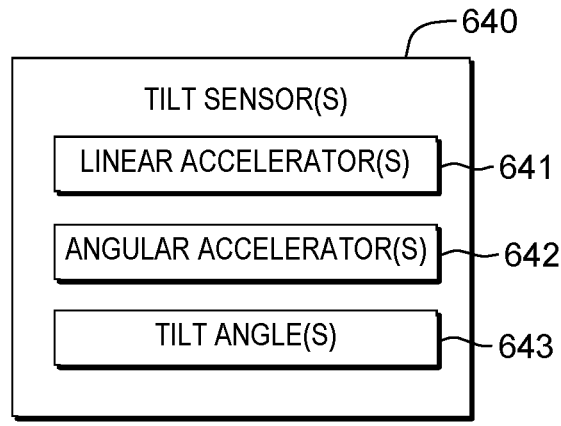
Figure 6C:
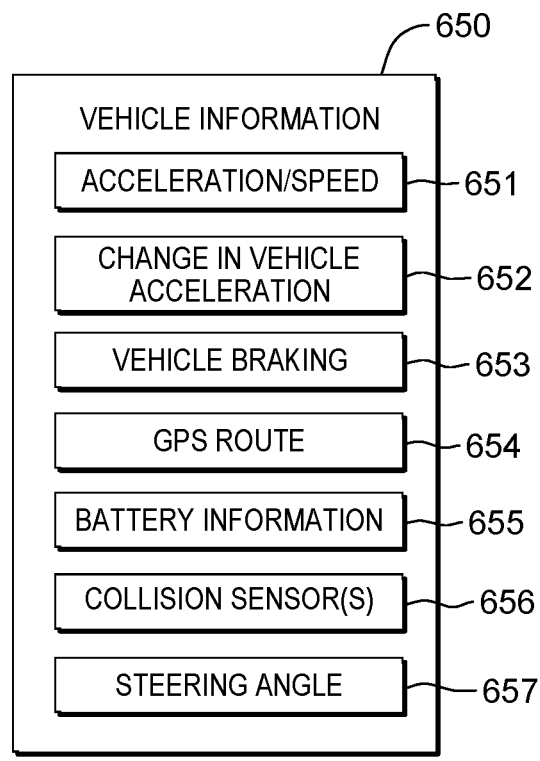

By way of further example, FIGS. 6A-6C depict one embodiment of an environment 600 (FIG. 6A) into which various aspects of some embodiments of the present invention can be implemented. Environment 600 includes computing devices, including one or more computing resources 540 that execute program code 541 that generates or updates a stability control 610 process or model, based on machine learning (e.g., via cognitive and/or learning agent 542), and utilizes stability control 610 to control producing in operation the desired stabilization torque for the self-stabilizing platform assembly to facilitate stabilizing product on the deck of the self-stabilizing platform assembly during moving of the platform assembly and product, as described herein.

For illustrative purposes only, stability control 610 is depicted in FIG. 6A as being housed on one or more separate computing resources 601 from the one or more computing resources 540 that execute program code 541. By way of example, computing resource(s) 601 housing stability control 610 can be located within the self-stabilizing platform assembly, such as depicted in FIGS. 2C & 3, while computing resource(s) 540 could be located separate from the self-stabilizing platform assembly. Note that this is a non-limiting example of an implementation, and the program code 541 and stability control 610 can also share a computing resource(s). Likewise, in the illustrated embodiment, program code 541 can be executed on varied resources in various embodiments of the present invention, where the learning agent 542 and the program code 541 are separate modules.

Figure 13:
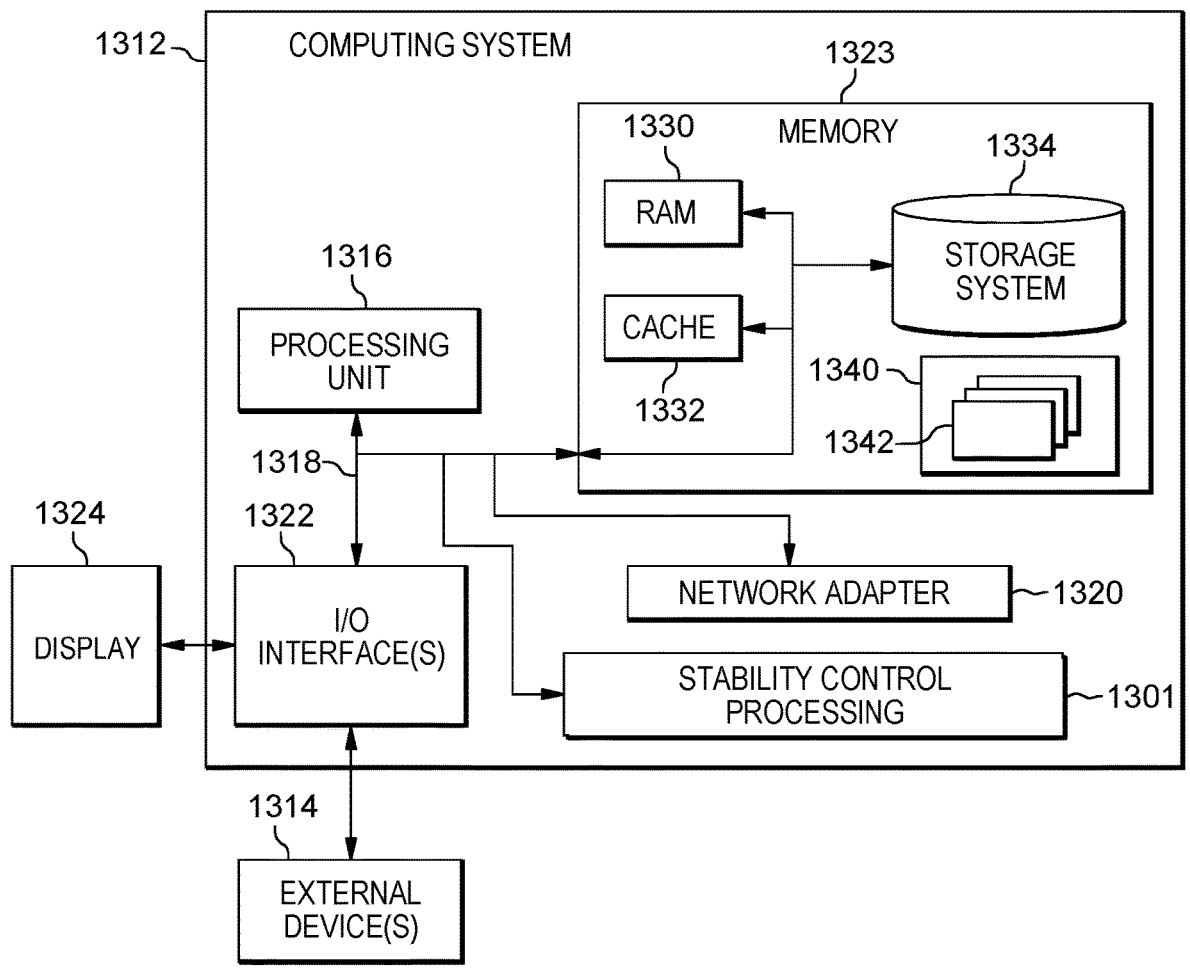
FIG. 13 depicts one embodiment of a computing system which can implement or facilitate implementing stability control processing, in accordance with one or more aspects of the present invention.

As understood by one skilled in the art, program code, as referred to in this application, can include both software and hardware. For example, program code in certain aspects of the present invention can include fixed function hardware, while other aspects can utilize a software-based implementation of the functionality described. Certain embodiments combine both types of program code. One example of program code, also referred to as one or more programs, is depicted in FIG. 13 as program/utility 1340, having a set (at least one) of program modules 1342, which can be stored in memory 1323.

Continuing with FIG. 6A, in embodiments of the present invention, program code 541 utilizes product data 610, such as from various sensors and/or sources to ascertain, for instance, dimensions 611, weight 612, center of gravity 613, etc., of the product or products being moved using the self-stabilizing platform assembly. In one or more further embodiments, product data 610 can be ascertained by learning agent 542 by accessing, for instance, a knowledge base 620, which can also include information on available terrain data 621 to be traversed in moving the self-stabilizing platform assembly and product, as well as historical data 622, such as historical specification data on products moved, as well as any other information useful to learning agent 542 in either determining, for instance, a tilt angle, or a desired counter-balancing torque once a tilt angle is detected.

A variety of data sources 630 can be employed to obtain data for use by stability control 610 and/or learning agent 542, such as described herein. These data sources 630 can be, in one or more embodiments, associated with the self-stabilizing platform assembly itself, or with the vehicle moving the platform assembly, or other sensors monitoring one or more conditions associated with moving the self-stabilizing platform assembly and product. For instance, data sources 630 can include one or more tilt sensors 640, which in one or more embodiments, can be associated with the self-stabilizing platform assembly. As illustrated in FIG. 6B, tilt sensors 640 can include, in one embodiment, one or more linear accelerators 641, angular accelerator(s) 642, and tilt angle sensors 643, such as electronic levels. Those skilled in the art will note that other tilt sensors 640 could also be associated with the self-stabilizing platform assembly to generate sensor data for stability control 610 and/or learning agent 542.

Additionally, or alternatively, the sensor data can be information associated with the vehicle moving the self-stabilizing platform assembly and product 650. For instance, FIG. 6C illustrates that vehicle information 650 sensed can include acceleration and/or vehicle speed data 651, change in vehicle acceleration data 652, vehicle breaking data 653, the GPS route being traversed by the vehicle 654, information on one or more vehicle batteries 655, particularly in the case where the self-stabilizing platform assembly is powered by the vehicle, as well as collision sensor information 656, and vehicle steering angle information 657.

As illustrated in FIG. 6A, additional data sources 630 can provide one or more of flywheel motor data 660, such as current speed of operation of the flywheel motors, range of operation of the flywheel motors, etc. Further, terrain sensors could be, in one or more embodiments, associated with the self-stabilizing platform assembly, and/or vehicle to sense, for instance, uneven or rough terrain 665. Historical terrain data 670 can also be provided based on prior routes traversed by the vehicle, as well as current geographic location of the vehicle, and the route being traversed by the vehicle using, for instance, data ascertained using Global Positioning System (GPS) coordinates 675. As noted above, the terrain information can be used in either a responsive mode, or a predictive mode, depending on whether the vehicle is currently traversing rough terrain, or about to be traversing rough terrain. In either case, stability control 610 can be configured to adjust the torque-generating devices to, for instance, rotate the associated flywheels in a high or max rate of rotation to provide optimal stability to the self-stabilizing platform assembly and product as the vehicle moves over the rough terrain. In one or more embodiments, environmental sensors, such as an anemometer to measure wind speed and direction could be used to provide further data to stability control 610 and/or learning agent 542, that is, where applicable to moving of the self-stabilizing platform assembly and product 680.

In one or more embodiments, program code 541 can be configured to update stability control 610 in real-time, upon receipt of sensor data from data source(s) 630. Program code 541 or learning agent 542 uses the obtained data to continually learn and update, in one or more embodiments, the patterns and rules that form stability control 610. For instance, an event that would trigger program code 541 to update the stability control 610 in real-time could be new sensor data, such as data indicating the vehicle is traversing a new path, and any terrain data being ascertained related to that new path, etc.

As noted, in embodiments of the present invention, program code 541 on one or more computing resources 540 can facilitate determining, either responsively or proactively, a stability control adjustment, such as a desired counter-balancing torque to be applied to the self-stabilizing platform assembly. The process can include cognitively analyzing the knowledge base 620 data accessible to program code 541, for instance, across a network, such as the Internet. The program code 541 uses the knowledge base 620, along with product data 610 and sensor data obtained from data source(s) 630, to tailor the stability control 610 process or model to dynamically enhance performance of the self-stabilizing platform assembly. For example, program code 541 with learning agent 542 can incorporate data from one or more sources to, for instance, extract recommended stability control adjustments for the self-stabilizing platform assembly based on various routes that may be taken by the vehicle.

In some embodiments, program code 541 executing on one or more resources 540 can apply machine learning algorithms to generate and train stability control 610. The program code and embodiments of the present invention can perform a cognitive analysis to generate data structures, including algorithms used by the program code to generate and provide the desired stability control 610. Machine learning (ML) solves problems that cannot be solved by numerical means alone. In an ML-based example, program code extracts various features/attributes from training data (e.g., data collected from various data sources, as well as product data and knowledge base information). The data or features are used to develop a particular function or hypothesis, which the program code uses as a machine learning model. In identifying a stability control adjustment for a particular movement scenario, the program code can utilize various techniques to select features (elements, patterns, attributes, etc.) including, but not limited to, diffusion mapping, principle component analysis, recursive feature elimination (a brute force approach to selecting features), and/or a random forest. The program code can utilize a machine learning algorithm to train the machine learning model (e.g., the algorithms utilized by the program code), including providing rankings or weights for extracted data or conclusions, so that the program code can train the predictor or recordation functions to include the machine learning model. The conclusions can be evaluated by a quality metric. By selecting an appropriate set of training data, the program code trains the machine learning model to identify and weight various attributes (e.g., features, patterns) that correlate (for example) a detected self-stabilizing platform assembly tilt, with a desired counter-balancing torque, including adjustments needed to particular rotating flywheels within the platform assembly to generate the desired torque.

Stability control 610, generated (in one embodiment) by program code 541, can be self-learning, as the program code 541 updates the stability control 610 based on feedback received from data sources 630 during the operational phase; that is, after the learning phase, and related to monitoring of the self-stabilizing platform assembly and product during transport. For example, when program code 541 determines that the platform assembly traverses a new terrain, or a different route, program code 541 can utilize learning agent 542 to update stability control 610 to reflect the new information, in order to improve future stability control of the self-stabilizing platform assembly. In one embodiment, program code 541 includes learning agent 542, which cognitively analyzes any new data deviating from the current stability control 610 model or process and adjusts the stability control to improve processing moving forward.

In some embodiments of the present invention, program code 541 executing on one or more computing resources 540 utilizes existing cognitive analysis tools (or agents) to create, and tune, stability control 610 based, for instance, on data obtain from various data sources, including product data 610, knowledge base 620 data, and data from data sources 630. Some embodiments of the present invention can utilize IBM Watson® as learning agent 542 (i.e., as a cognitive agent). IBM Watson® is a registered trademark of International Business Machines Corporation, Armonk, N.Y., USA. In embodiments of the present invention, program code 541 interfaces with IBM Watson® application program interfaces (APIs) to perform a cognitive analysis of obtained data. In some embodiments of the present invention, program code 541 interfaces with the application program interfaces (APIs) that are part of a known cognitive agent, such as the IBM Watson® Application Programing Interface (API), a product of International Business Machines Corporation, to determine impacts on, for instance, a detected tilt, based on a generated counterbalancing torque or force, and direction of the counterbalancing torque, etc.

In some embodiments of the present invention, certain of the APIs of, for instance, the IBM Watson® API, include a cognitive agent (e.g., learning agent) that includes one or more programs, including, but not limited to, natural language classifiers, Retrieve and Rank (i.e., a service available through the IBM Watson® developer cloud that can surface the most relevant information from a collection of documents), concept/visual insights, tradeoff analytics, document conversion and/or relationship extraction. In an embodiment of the present invention, one or more programs to analyze the data obtained by the program code 541 across various sources can utilize one or more of a natural language classifier, Retrieve and Rank APIs, and tradeoff analytics APIs.

The program code 541 can provide predictions or recommendations for a given transport scenario as values vary. In some embodiments of the present invention, program code 541 can provide specific responsive adjustments to be made by stability control 610 reactive to sensed data on, for instance, the tilt of the self-stabilizing platform assembly, or action of the vehicle, and/or other conditions associated with moving of the self-stabilizing platform assembly and product. In other embodiments of the present invention, program code 541 can provide stability control based on predictive analytics using, for instance, available terrain information, vehicle transport routes, etc.

In some embodiments of the present invention, program code 541 utilizes a neural network to analyze collected data relative to stability control 610 to generate a desired action by the stability control system, such as adjusting rate of rotation of one or more flywheels of the stability control system. Neural networks are a programming paradigm which enable a computer to learn from observational data, in this case sensor data, product data, and knowledge base information, etc. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks, are non-linear statistical data modeling or decision making tools). In general, program code 541 utilizing neural networks can model complex relationships between inputs and outputs and identify patterns of data. Because of the speed and efficiency of neural networks, especially when parsing multiple complex data sets, neural networks and deep learning can provide solutions to many problems in multiple-source processing, where program code 541 and embodiments of the present invention can be used to, for instance, build a processing model for stability control 610.

As discussed, presented herein in one or more aspects are methods for dynamically preventing tilting, and thus tipover of a product during transport, using a self-stabilizing platform assembly. In one or more embodiments, the methods include moving a self-stabilizing platform assembly with product on a deck of the platform assembly. The self-stabilizing platform assembly includes multiple torque-generating devices, and a stability control system to control operation of the multiple torque-generating devices, as well as the deck to support the product being moved. The method further includes adjusting, by the stability control system, operation of one or more torque-generating devices of the multiple torque-generating devices to produce during the moving of the platform assembly and product a stabilization torque within the self-stabilizing platform assembly to facilitate stabilizing the product during moving of the self-stabilizing platform assembly and product.

Figure 7:
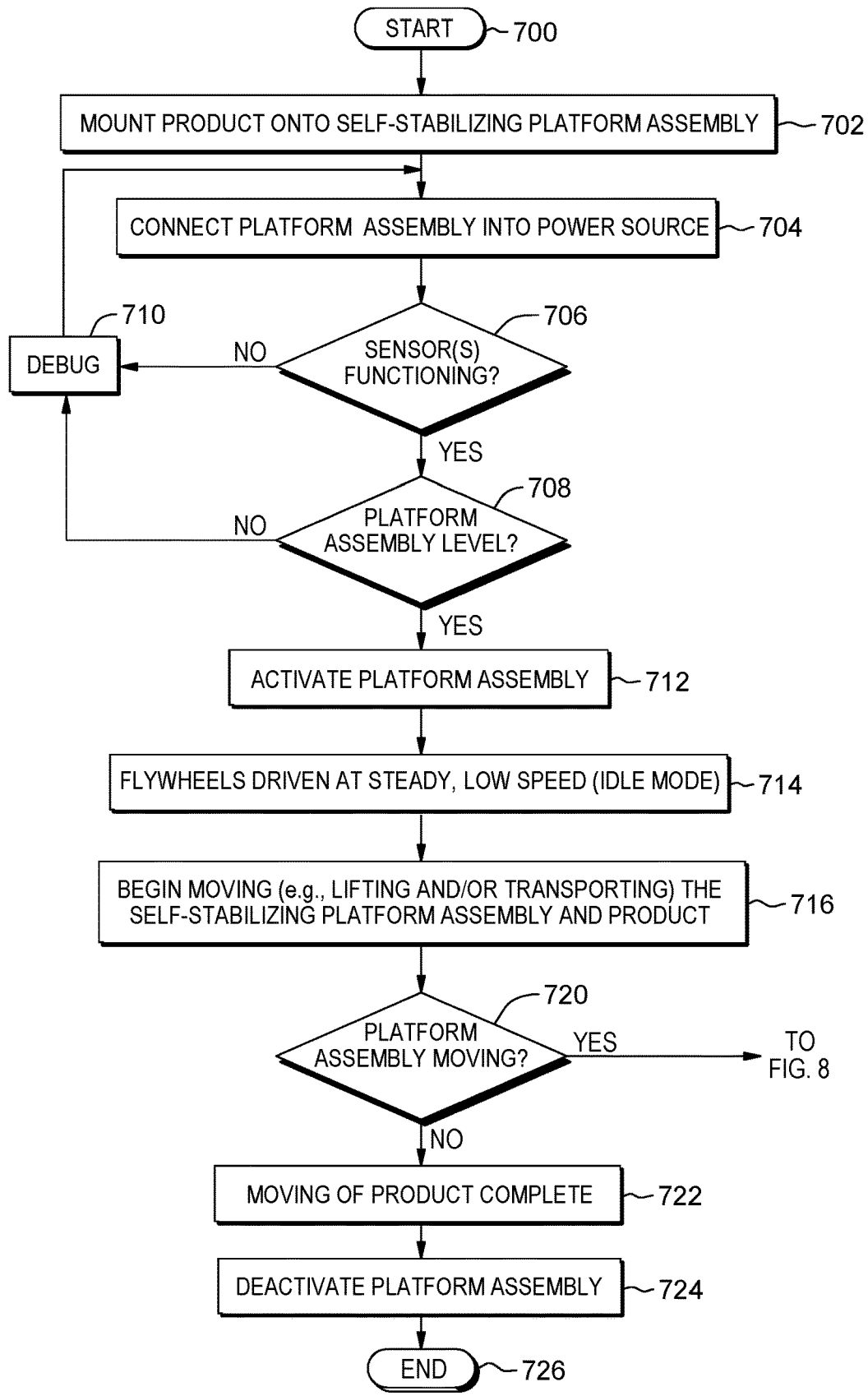
FIG. 7 depicts one embodiment of an operational process flow that illustrates certain aspects of some embodiment of the present invention.

By way of example, FIG. 7 depicts one embodiment of an operational process flow that illustrates certain aspects of the present invention. As illustrated, the process starts 700 with the product being placed on, mounted to, etc., the deck of the self-stabilizing platform assembly 702. The self-stabilizing platform assembly is connected to a power source 704, and a check is made to determine whether the one or more sensors that are to provide sensor data are operational 706. If any sensor is non-operational, the reason therefor is debugged or determined 710, which can include replacing a failing sensor where appropriate. Assuming that the sensors are functioning, processing determines whether the platform assembly is initially level 708. If not, then the reason for the self-stabilizing platform assembly being un-level at the time of activation is debugged or determined 710, which can include leveling the self-stabilizing platform assembly before beginning operation. For instance, an assumption is made that the self-stabilizing platform assembly and product are on level ground before the vehicle engages the platform assembly to lift the platform assembly and product. The platform assembly is activated 712, and the flywheels and torque-generating devices within the self-stabilizing platform assembly are initialized to a steady, low speed (or idle mode) 714 (in one embodiment).

Once the flywheels are being driven in idle mode, moving of the self-stabilizing platform assembly and product begins 716. Processing determines whether the platform assembly is in motion 720. If so, processing continues as outlined in FIG. 8. Once moving of the platform assembly is complete, or paused for a threshold amount of time, then processing may determine that the moving of the product is complete 722 and deactivate the platform assembly 724, ending the process 726.

Figure 8:
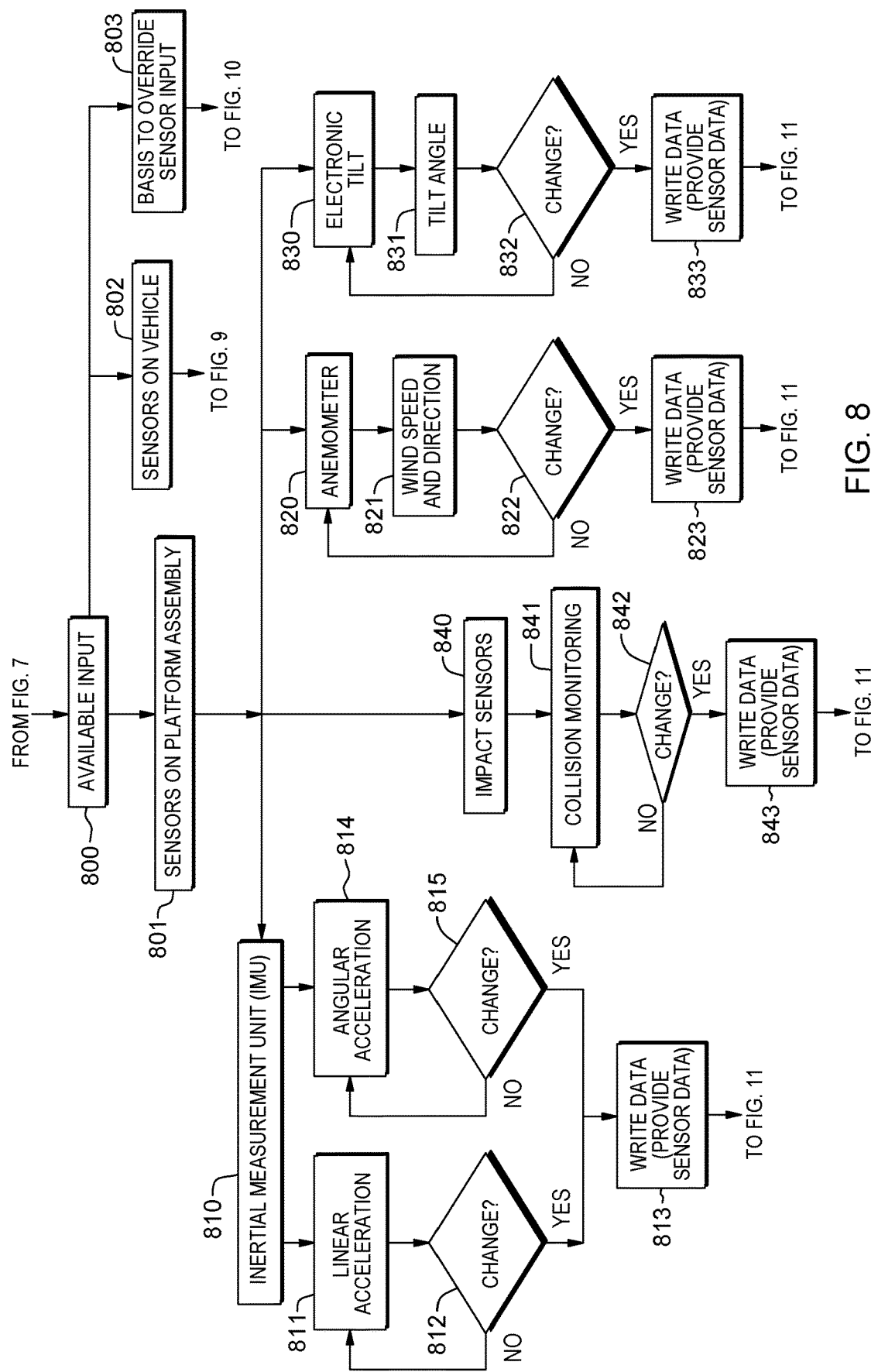
FIG. 8 depicts further details of one embodiment of an operational process flow based on sensor data provided by sensors associated with the self-stabilizing platform assembly, in accordance with one or more aspects of the present invention.

While the self-stabilizing platform assembly and product are being moved, processing continues, in one embodiment, with the operational flow of FIG. 8, where the available input can include data from the sensors on the platform assembly 801, data from sensors on the vehicle 802, as well as an override action taken by, for instance, a vehicle operator or the control system 803. Process flow embodiments relating to the data obtained from sensors on the vehicle 802 and related to an operator or system override are described further below with reference to FIGS. 9 & 10, respectively. Note that evaluation of available input 800 can occur dynamically, and data can be from multiple different types of sensors on the platform assembly and/or the vehicle, or can be an override action by an operator or the system. For instance, where there are multiple sensors providing respective sensor data, only one sensor may provide data that is of concern to the stability control system, and based upon which the stability control system determines to take an action, such as adjust operation of one or more torque-generating devices of the multiple torque-generating devices within the platform assembly.

In one embodiment, an inertial measurement unit (IMU) 810 can be included with the self-stabilizing platform assembly. The inertial measurement unit 810 can monitor linear acceleration 811, and processing can determine whether there has been a change in linear acceleration 812 beyond a threshold at which point data can be written 813 for processing by the stability control system. Note that the writing of data in the process flows of the figures presented herein is synonymous with providing the sensor data to, for instance, processing of the stability control system. The inertial measurement unit 810 can further monitor angular acceleration 814 of the self-stabilizing platform assembly, and processing can determine whether there is a change in angular acceleration above a defined threshold 815. If so, then data is written 813 for further processing by the stability control system as illustrated, for instance, in the process flow of FIG. 11.

Figure 11:
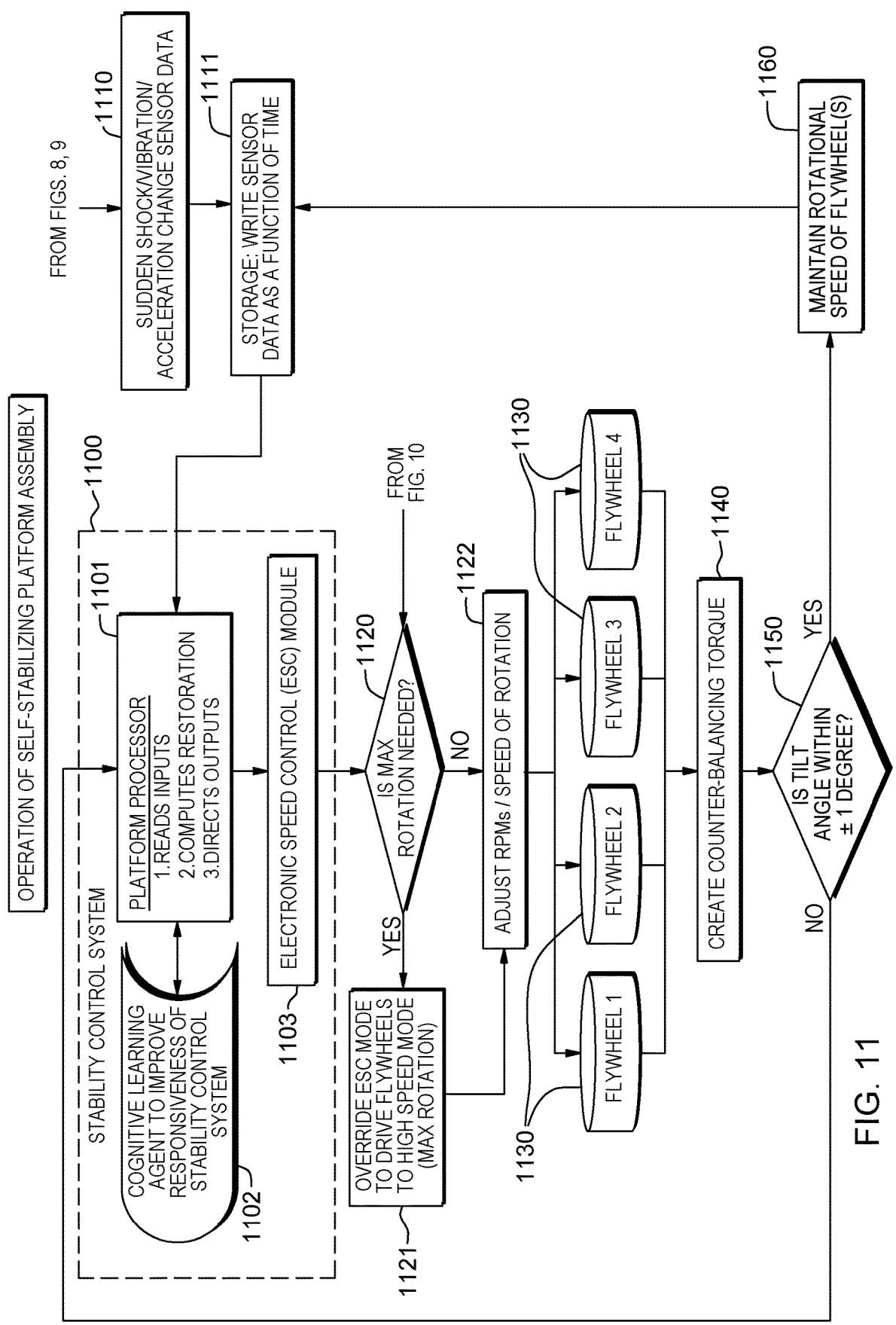
FIG. 11 depicts additional operational process flow illustrating certain further aspects of some embodiments of the present invention.

In the embodiment of FIG. 8, an anemometer 820 can be associated with the self-stabilizing platform assembly to facilitate monitoring wind speed and direction 821 experienced by the self-stabilizing platform assembly during moving of the platform assembly and product. Processing determines whether there has been a change above a predetermined threshold 822, and if so, data is written 823 for further action by the stability control system, such as indicated in the process of FIG. 11.

Additionally, the platform assembly sensors can include one or more electronic tilt sensors 830 which monitor for a tilt angle 831. If the platform assembly tilt angle exceeds a threshold, or the rate of tilting exceeds a threshold, then the determined change 832 is written as data for the stability control system 833.

Further, in one or more embodiments, impact sensors 840 can be associated with the self-stabilizing platform assembly to monitor for a collision 841. If a collision occurs, resulting in an unexpected change in direction, speed, etc., of the self-stabilizing platform assembly above a predetermined threshold 842, then data is written 843 for further processing by the stability control system.

Figure 9:
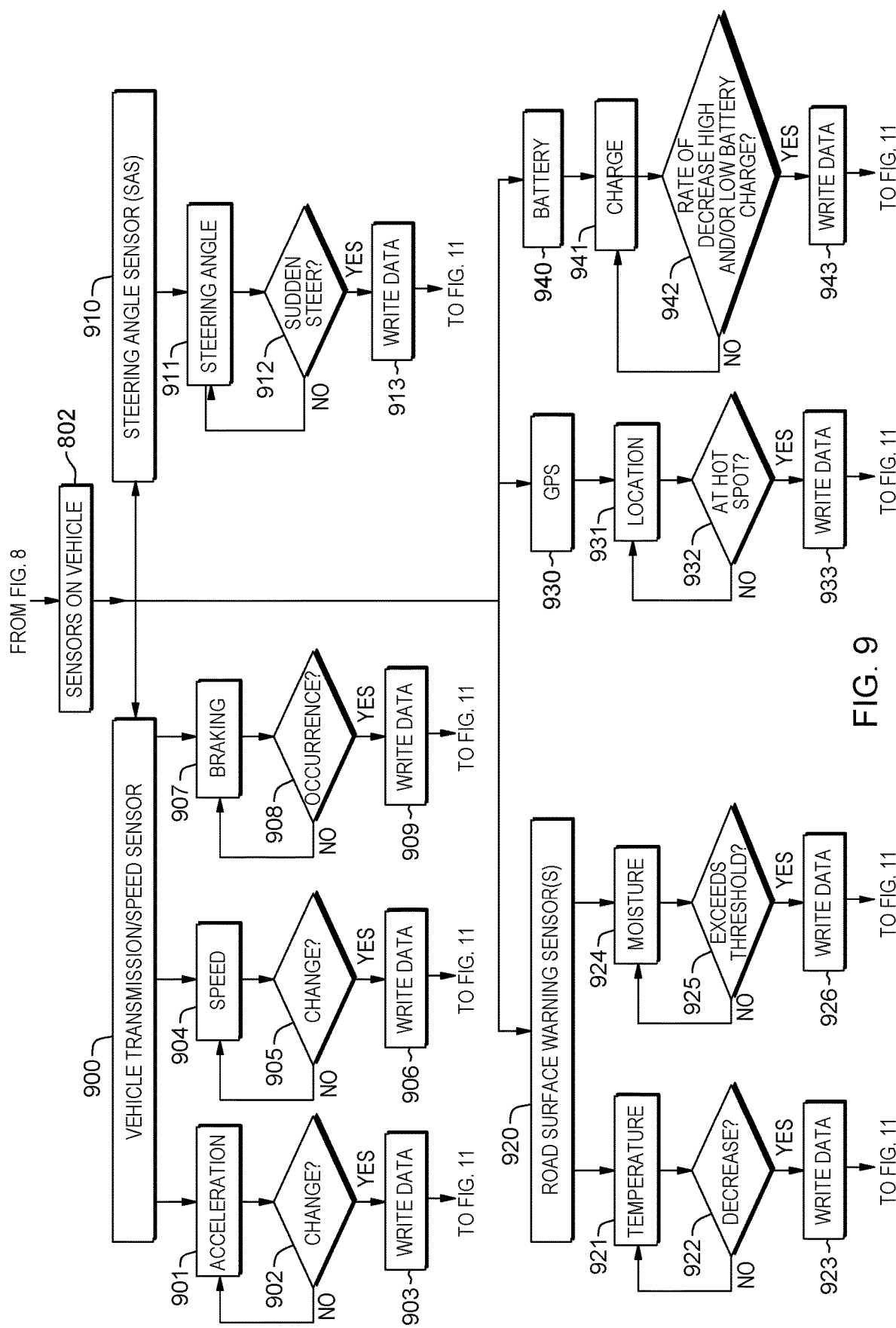
FIG. 9 depicts further details of one embodiment of an operational process flow using sensor data provided by sensors associated with the transporting vehicle, in accordance with one or more aspects of the present invention.

As noted, FIG. 9 depicts exemplary processing in connection with one or more sensors on the vehicle moving the self-stabilizing platform assembly and product 802. In the embodiment illustrated, one or more vehicle transmission and/or speed sensors 900 can be provided to monitor for acceleration 901, speed 904, or braking 907 of the vehicle. Processing determines whether there is an acceleration change above a predetermined threshold 902, and if so, writes data 903 for further processing by the stability control system. Further, processing determines whether there is a speed change beyond a predetermined threshold 905, and if so, writes data 906 for further processing by the stability control system. Additionally, processing determines whether the vehicle suddenly brakes 908, that is, brakes beyond a predetermined rate of braking threshold, and if so, writes the sensor data 909 for further processing by the stability control system, such as in the embodiment of FIG. 11.

The sensors on the vehicle can also include a steering angle sensor 910, which monitors steering angle 911. Should there be a sudden change in steering angle 912, such as above a defined rate of change threshold, data is written 913 for further processing by then stability control system.

As illustrated, one or more road surface warning sensors 920 can be provided to monitor, for instance, temperature 921 and moisture 924. If the temperature monitoring indicates a decrease in temperature 922, for instance, below freezing, then sensor data can be written 923 for further processing. Similarly, if the road surface warning sensor identifies significant increase in moisture above a defined threshold 925, then data can be written 926 for further processing by the stability control system.

The sensors on the vehicle can further include, in one or more embodiments, a Global Positioning System (GPS) system 930 which identifies location 931 of the vehicle. Based on this information, the processing can determine whether the vehicle is either at or approaching a known hot spot, such as an area known to include rough terrain 932. If so, data can be written 933 for further processing by the stability control system.

Further, one or more sensors can be provided to monitor battery charge 940 associated with the vehicle. This configuration can be beneficial where, for instance, the torque-generating devices within the self-stabilizing platform assembly are being powered by one or more batteries associated with the vehicle. The battery sensors monitor battery charge 941. If the rate of decrease of battery charge is high, for instance, above a predefined threshold, and/or the current battery charge is low 942, then sensor data 943 can be written for further processing by the stability control system, such as illustrated in FIG. 11.

Figure 10:
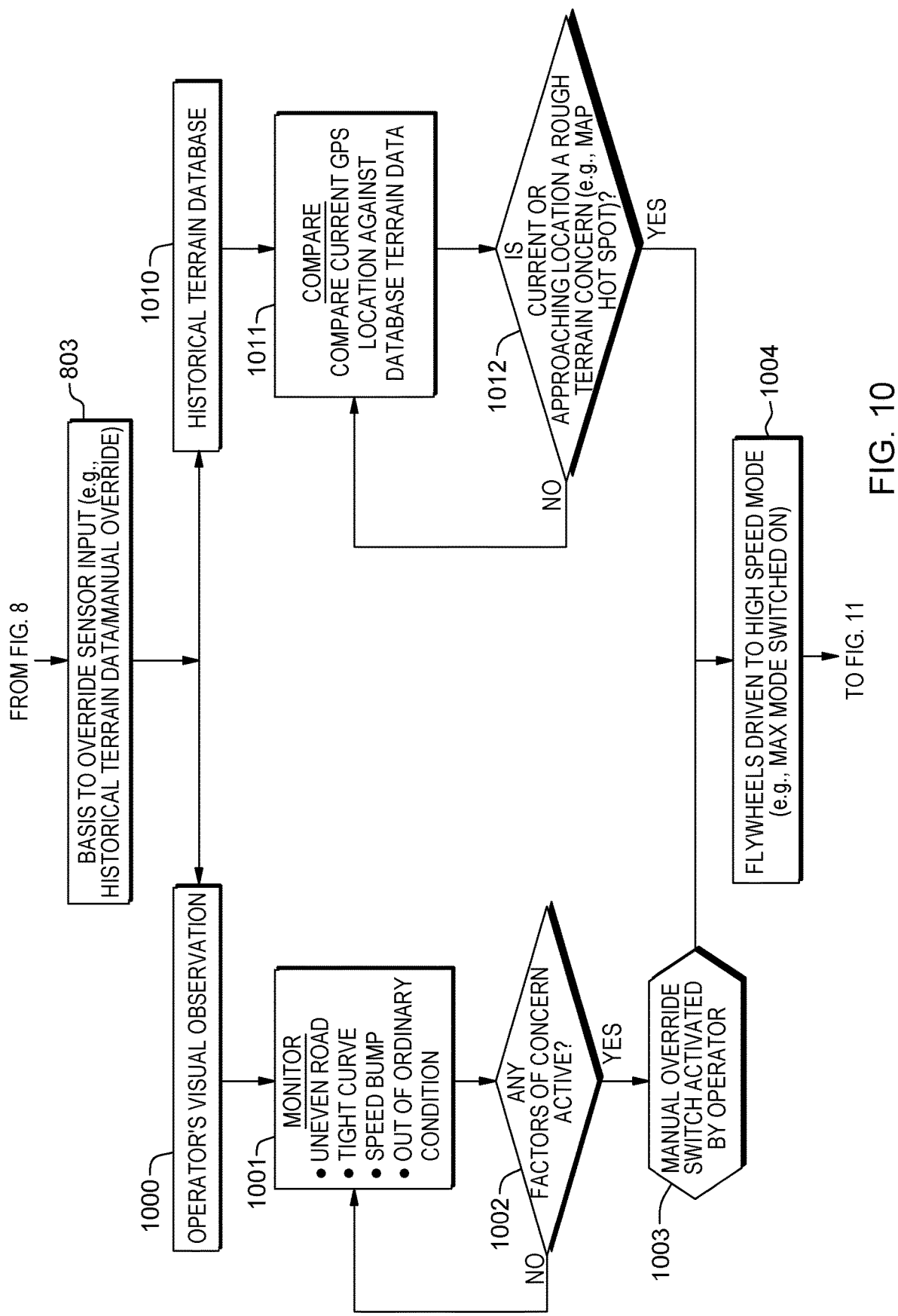
FIG. 10 depicts a further operational process flow that illustrates various aspects of some embodiments of the present invention.

FIG. 10 depicts one embodiment of processing in the event of a basis to override sensor data input, such as may be the case where there is a manual operator override, or a system override where, for instance, historical terrain data predicts that an override action is desirable 803.

During operation, a vehicle operator may visually observe conditions in a travel route of the vehicle moving the self-stabilizing platform assembly and product 1000. By way of example, the operator can monitor for an uneven road condition, tight curve ahead, speed bump ahead, rough terrain, or any out of ordinary condition which may be of concern as potentially leading to a tilting of the platform assembly and product 1002. If a concern is identified by the operator, the operator can manually override the stability control system control by activating an override switch 1003. By activating the override switch, the operator directs the stability control system place the flywheels in the high-speed or power mode, where the flywheels are driven, for instance, at a highest or maximum specified speed 1004.

In addition, the control system can maintain or reference a historical terrain database 1010, which can be used to compare, for instance, current GPS location of the vehicle against the database of terrain data 1011. Based on the comparison, processing can determine whether the current location, or an approaching location, is a historically rough terrain concern (e.g., maps a hot spot) 1012. If so, then the stability control system can place the flywheels of the torque-generating devices into the high-speed or power mode (e.g., a highest or maximum specified rate of rotation) 1004.

FIG. 11 depicts one embodiment of further operational processing of a self-stabilizing platform assembly, such as disclosed herein. As noted, sensor data, or action indications, can be received from the process flows of FIGS. 8-10. The stability control system 1100 determines whether there is a sudden shock, vibration, and/or acceleration change in the sensor data 1110, with the sensor data being written as a function of time to storage 1111. The stability control system 1100 includes, in one or more embodiments, a platform assembly processor which reads inputs, computes the restoration needed, and directs outputs (that is, control signals) to the torque-generating devices 1101. As noted, the stability control system can utilize, in one or more implementations, a cognitive learning agent to improve responsiveness of the stability control system 1102, such as described above in condition with FIGS. 6A-6C. Further, in one or more embodiments, the stability control system 1100 can include an electronic speed control (ESC) module 1103, which can reside within the self-stabilizing platform assembly. Stability control system 1100 determines whether maximum rotation of the torque-generating devices is needed 1120. If "no", then the speed of rotation of one or more of the torque-generating devices 1130 (e.g., flywheels) can be adjusted 1122 based on the sensor data. If maximum rotation of the flywheels is required, then the electronic speed control mode is overwritten, to drive the flywheels to a highest speed or power mode (max rotation) 1121. Driving the flywheels in the high-speed mode, and/or selectively adjusting or increasing speed of rotation of one or more of the flywheels is tailored by the control system to create the needed counter-balancing torque 1140 based on the input data. With application of the counter-balancing torque, processing determines whether the tilt angle is within a predefined window of level, for instance, is within plus or minus 1 degree of level 1150. Once level, the rotational speed of the flywheels can be returned to the idle mode, or maintained if desired 1160.

Further details of one or more embodiments of a method incorporating one or more aspects of the present invention are described with reference to FIGS. 12A-12C.

Figure 12A:
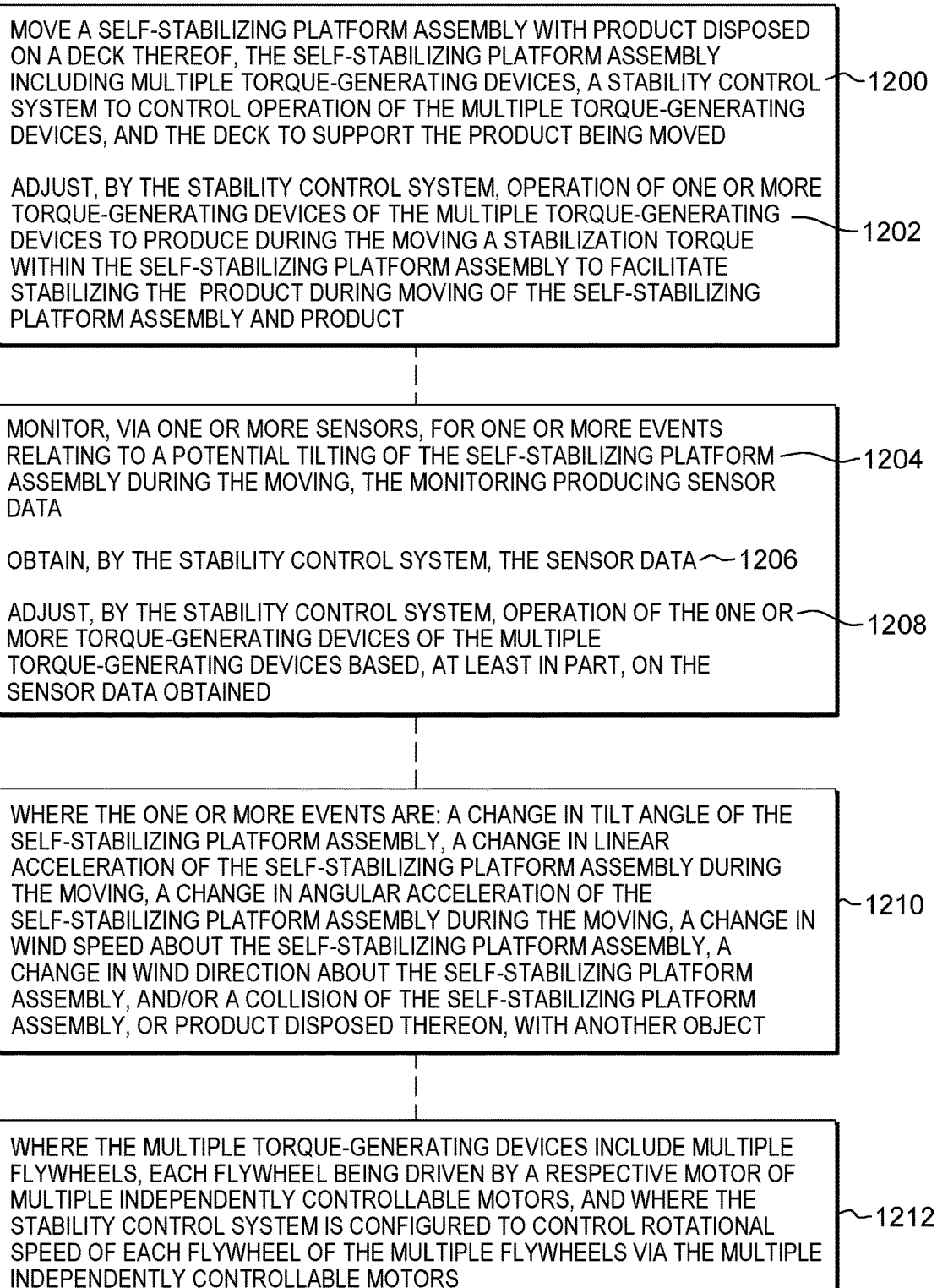

Referring to FIG. 12A, in one embodiment, a method is presented which includes moving a self-stabilizing platform assembly with product disposed on a deck thereof (1200). The self-stabilizing platform assembly includes multiple torque-generating devices, a stability control system to control operation of the multiple torque-generating devices, and the deck to support the product being moved. Further, the method includes adjusting, by the stability control system, operation of one or more torque-generating devices of the multiple torque-generating devices to produce during the moving a stabilization torque within the self-stabilizing platform assembly to facilitate stabilizing the product during moving of the self-stabilizing platform assembly and product (1202).

In one or more embodiments, the method further includes monitoring, via one or more sensors, for one or more events relating to a potential tilting of the self-stabilizing platform assembly during the moving, where the monitoring produces sensor data (1204). As illustrated, the stability control system obtains the sensor data (1206) and adjusts operation of the one or more torque-generating devices of the multiple torque-generating devices based, at least in part, on the sensor data obtained (1208).

In one embodiment, the one or more events can include a change in tilt angle of the self-stabilizing platform assembly, a change in linear acceleration of the self-stabilizing platform assembly during the moving, a change in angular acceleration of the self-stabilizing platform assembly during the moving, a change in wind speed about the self-stabilizing platform assembly, a change in wind direction about the self-stabilizing platform assembly, and/or a collision of the self-stabilizing platform assembly, or product disposed thereon, with another object (1210).

In one or more embodiments, the multiple torque-generating devices include multiple flywheels, with each flywheel being driven by a respective motor of multiple independently controllable motors, and wherein the stability control system is configured to control rotational speed of each flywheel of the multiple flywheels via the multiple independently controllable motors (1212).

As illustrated in FIG. 12B, the adjusting operation of the one or more torque-generating devices of the multiple torque-generating devices can include increasing rotational speed of one or more flywheels of the one or more torque-generating devices based, at least in part, on the sensor data obtained, to produce during the moving the stabilization torque within the self-stabilizing platform assembly to facilitate stabilizing the self-stabilizing platform assembly during the moving of the self-stabilizing platform assembly and product (1214).

In one embodiment, the deck of the self-stabilizing platform assembly is rectangular-shaped, and the multiple torque-generating devices include four torque-generating devices. Each torque-generating device of the four torque-generating devices is disposed closest to a respective corner of the rectangular-shaped deck of the self-stabilizing platform assembly, and the method further includes rotating, by the stability control system, two of the flywheels disposed diagonally in the self-stabilizing platform assembly below the deck clockwise, and rotating two other of the flywheels disposed diagonally in the self-stabilizing platform assembly below the deck counter-clockwise (1216).

In one embodiment, at least one sensor of the one or more sensors is associated with the self-stabilizing platform assembly (1218).

In one or more embodiments, the moving is via a vehicle moving the self-stabilizing platform assembly and product, and the monitoring further includes monitoring for one or more events related to a potential tilting of the self-stabilizing platform assembly, or related to continued operation of the self-stabilizing platform assembly (1220).

In one or more implementations, the one or more events are: a steering angle change of the vehicle, an acceleration change of the vehicle, a speed change of the vehicle, a braking of the vehicle, a temperature change of a surface traversed by the vehicle, a moisture change of the surface traversed by the vehicle, a change in condition of the surface traversed by the vehicle, a location of the vehicle in a prior problem area, and/or an above-threshold rate of decrease in charge powering operation of the multiple torque-generating devices of the self-stabilizing platform assembly (1222).

Figure 12C:
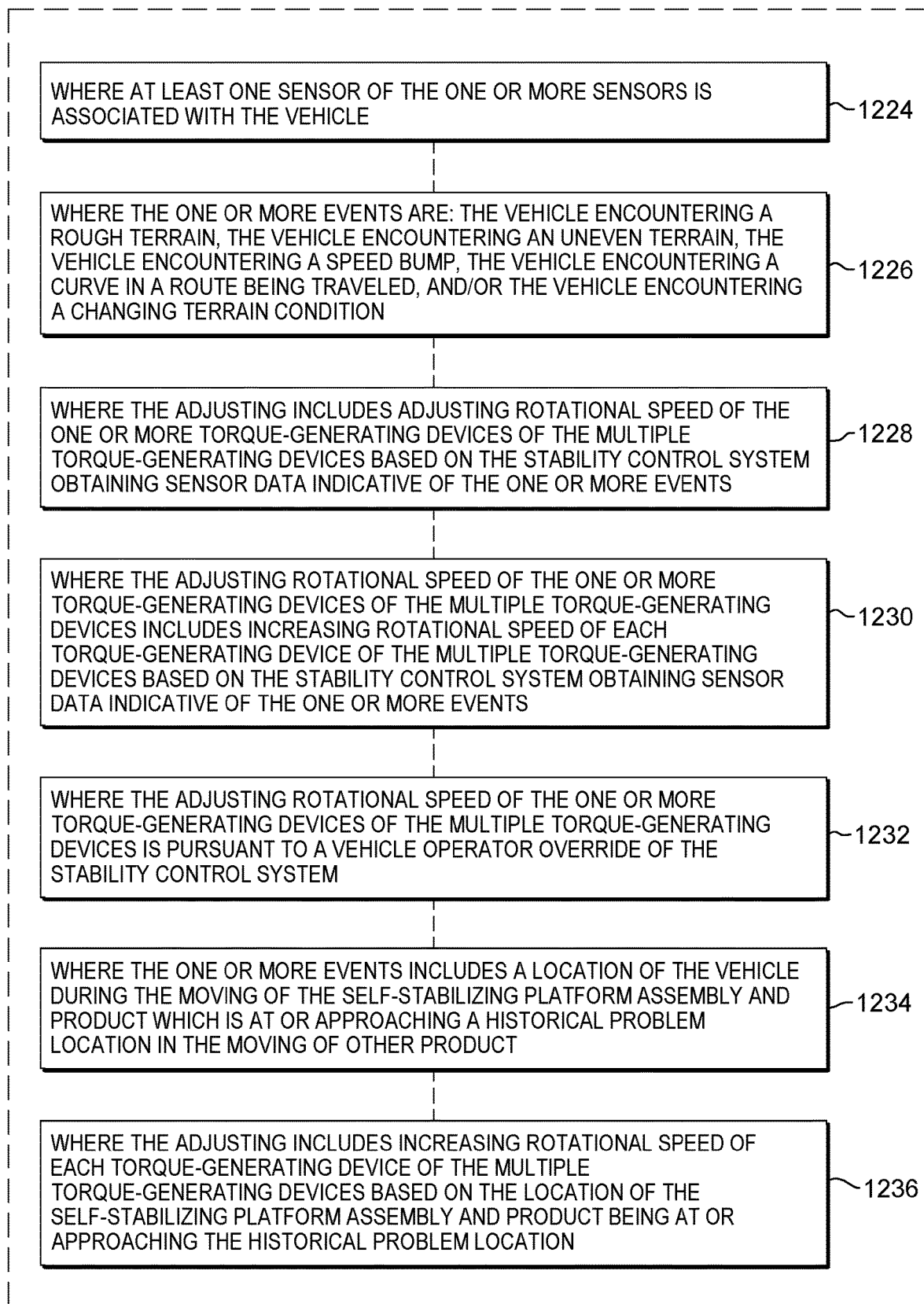

As illustrated in FIG. 12C, the at least one sensor of the one or more sensors can be associated with the vehicle (1224).

Further, in one or more embodiments, the one or more events can be: the vehicle encountering a rough terrain, the vehicle encountering an uneven terrain, the vehicle encountering a speed bump, the vehicle encountering a curve in a route being traveled, and/or the vehicle encountering a change in terrain condition (1226). Further, the adjusting can include adjusting rotational speed of the one or more torque-generating devices of the multiple torque-generating devices based on the stability control system obtaining sensor data indicative of the one or more events (1228). By way of example, the adjusting rotational speed of the one or more torque-generating devices of the multiple torque-generating devices can include increasing rotational speed of each torque-generating device of the multiple torque-generating devices based on the stability control system obtaining sensor data indicative of the one or more events (1230).

In one or more embodiments, the adjusting rotational speed of the one or more torque-generating devices of the multiple torque-generating devices can be pursuant to an operator override of the stability control system (1232).

Further, in one or more embodiments, the one or more events include a location of the vehicle during the moving of the platform assembly and product which is at or approaching a historical problem location in the moving of other product (1234). In one embodiment, the adjusting can include increasing rotational speed of each torque-generating device of the multiple torque-generating devices based on the location of the self-stabilizing platform assembly and product being at or approaching a historical problem location (1236).

Further exemplary embodiments of a computing environment to implement one or more aspects of the present invention are described below with reference to FIGS. 13-15.

By way of further example, FIG. 13 depicts one embodiment of a computing environment 1300, which includes a computing system 1312. Examples of well-known computing systems, environments, and/or configurations that may be suitable for use with computer system 1312 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1312 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 13, computing system 1312, is shown in the form of a general-purpose computing device. The components of computing system 1312 can include, but are not limited to, one or more processors or processing units 1316, a system memory 1323, and a bus 1318 that couples various system components including system memory 1323 to processor 1316.

In one embodiment, processor 1316 can be based on the z/Architecture® offered by International Business Machines Corporation, or other architectures offered by International Business Machines Corporation or other companies.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1312 can include a variety of computer system readable media. Such media may be any available media that is accessible by computing system 1312, and it includes both volatile and non-volatile media, removable and non-removable media.

System memory 1323 can include computer system readable media in the form of volatile memory, such as random access memory (RAM) 1330 and/or cache memory 1332. Computing system 1312 can further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1318 by one or more data media interfaces. As described below, memory 1323 can include at least one program product having a set (e.g., at least one) of program modules or code that are configured to carry out the functions of embodiments of the invention.

Program/utility 1340, having a set (at least one) of program modules 1342, can be stored in memory 1332 by way of example, and not limitation, as well as an operating system, one or more application programs, other program modules, and program data. Each of the operating system, one or more application programs, other program modules, and program data or some combination thereof, can include an implementation of a networking environment. Program modules 1342 generally carry out the functions and/or methodologies of embodiments of the invention as described herein. Alternatively, a stability control processing module, logic, etc., 1301 can be provided within computing environment 1312.

Computing system 1312 can also communicate with one or more external devices 1314 such as a keyboard, a pointing device, a display 1324, etc.; one or more devices that enable a user to interact with computing system 1312; and/or any devices (e.g., network card, modem, etc.) that enable computing system 1312 to communicate with one or more other computing devices. Such communication can occur via Input/Output (I/O) interfaces 1322. Still yet, computing system 1312 can communicate with one or more networks such as a local area network (LAN), a general wide area network (WAN), and/or a public network (e.g., the Internet) via network adapter 1320. As depicted, network adapter 1320 communicates with the other components of computing system, 1312, via bus 1318. It should be understood that although not shown, other hardware and/or software components could be used in conjunction with computing system 1312. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 13. Computer system/server 1312 of FIG. 13 can be practiced in distributed cloud computing environments where tasks are performed by remote processing devices that are linked through a communications network. In a distributed cloud computing environment, program modules may be located in both local and remote computer system storage media including memory storage devices. Computer system/server 1312 is capable of being implemented and/or performing any of the functionality set forth hereinabove.

Figure 14:
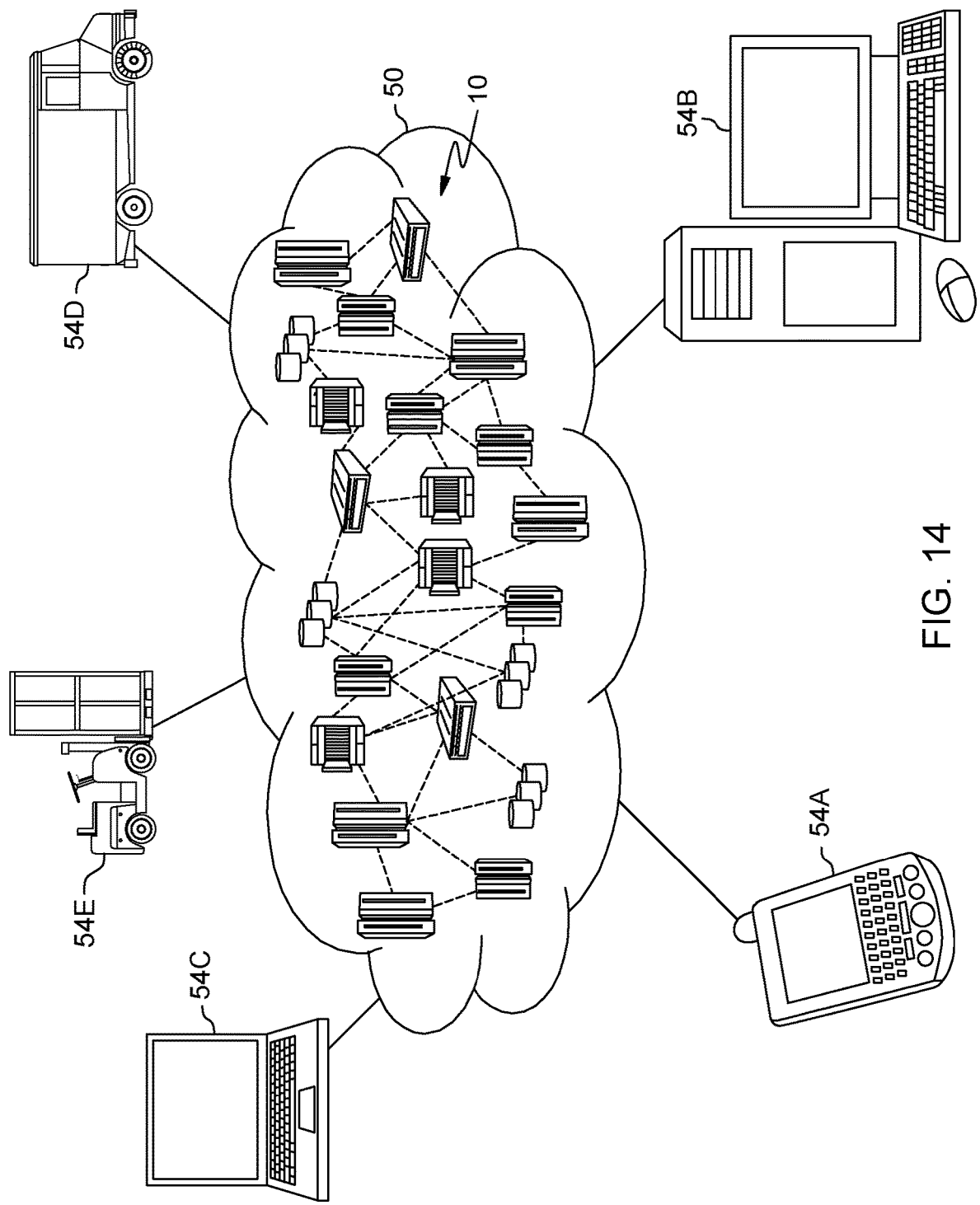
FIG. 14 depicts one embodiment of a cloud computing environment which can facilitate implementing, or be used in association with, one or more aspects of the present invention.

Referring now to FIG. 14, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, a transport vehicle 54D, and/or another vehicle, such as a fork-lift 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
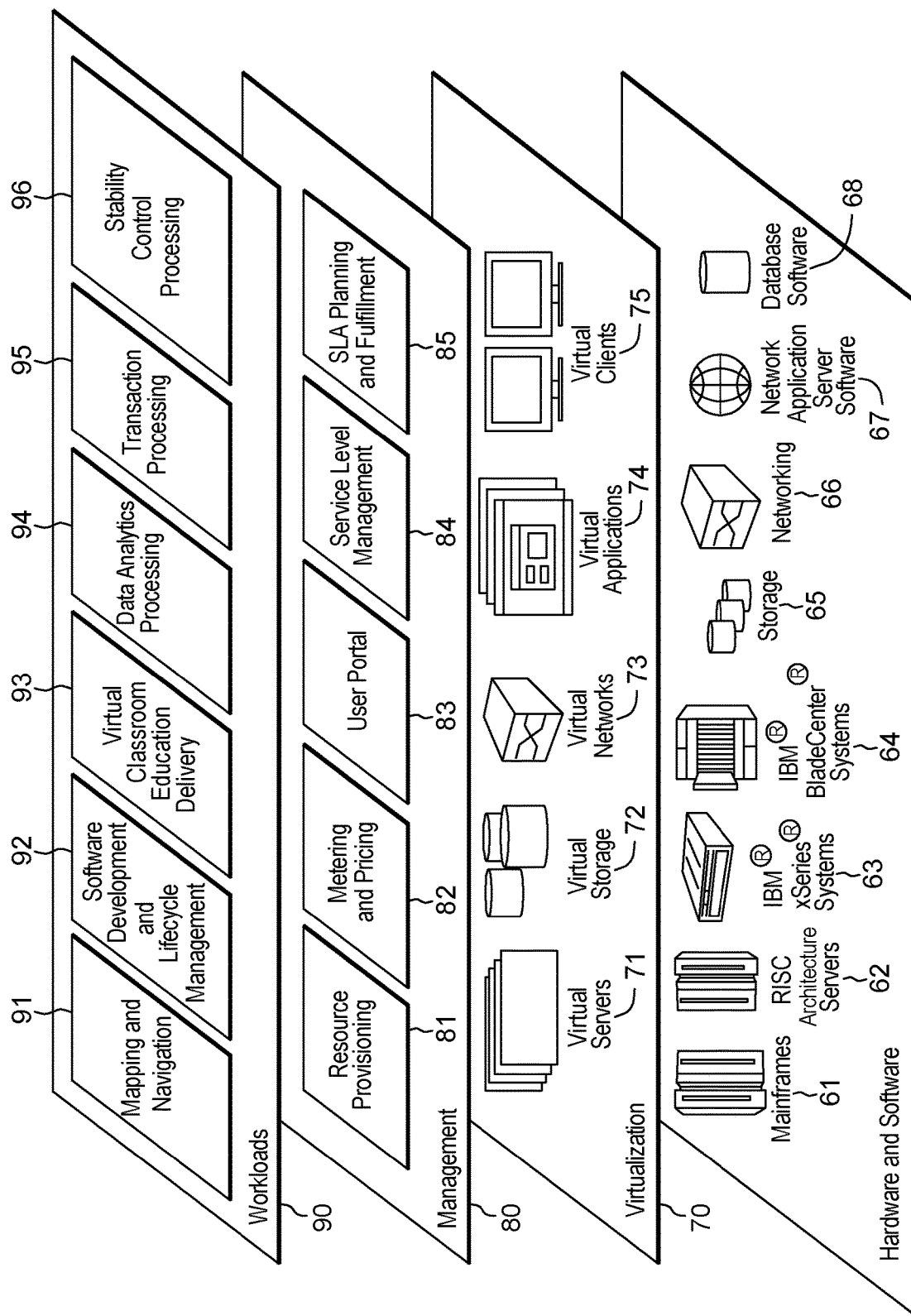
FIG. 15 depicts an example of abstraction model layers, which can facilitate implementing stability control processing, in accordance with one or more aspects of the present invention.

Referring to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stability control processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A product transport system comprising:
    a self-stabilizing platform assembly configured to support a product on a deck of the self-stabilizing platform assembly and to stabilize the product during moving of the self-stabilizing platform assembly and product, the self-stabilizing platform assembly comprising:
        multiple torque-generating devices controllable to produce a stabilization torque within the self-stabilizing platform assembly, the multiple torque-generating devices of the self-stabilizing platform assembly being disposed below the deck to support the product; and
        a stability control system to control operation of the multiple torque-generating devices, the stability control system being configured to adjust operation of one or more torque-generating devices of the multiple torque-generating devices to produce in operation the stabilization torque to facilitate stabilizing the product on the deck during moving of the self-stabilizing platform assembly and product.

2. The product transport system of claim 1, wherein the moving is via a vehicle moving the self-stabilizing platform assembly and product, and the multiple torque-generating devices are disposed within the self-stabilizing platform assembly below the deck.

3. The product transport system of claim 2, wherein the self-stabilizing platform assembly comprises a pallet, and the deck of the self-stabilizing platform assembly is a deck of the pallet.

4. The product transport system of claim 3, wherein the multiple torque-generating devices comprise multiple flywheels, each flywheel being driven via a respective motor of multiple independently controllable motors, the stability control system being configured to control rotational speed of each flywheel of the multiple flywheels via the multiple independently controllable motors.

5. The product transport system of claim 4, wherein the stability control system is configured to adjust rotational speed of the multiple flywheels according to, in part, sensor data of one or more sensors associated with the self-stabilizing platform assembly or the vehicle.

6. The product transport system of claim 4, wherein the multiple flywheels are disposed within the pallet below the deck.

7. The product transport system of claim 3, wherein the deck of the self-stabilizing platform assembly is rectangular-shaped, and the multiple torque-generating devices comprise four torque-generating devices, each torque-generating device of the four torque-generating devices being disposed closest to a respective corner of the rectangular-shaped deck of the self-stabilizing platform assembly.

8. The product transport system of claim 7, wherein the four torque-generating devices comprise four flywheels, and in operation, two flywheels of the four flywheels disposed diagonally in the self-stabilizing platform assembly below the deck rotate clockwise, and two other flywheels of the four flywheels disposed diagonally in the self-stabilizing platform assembly below the deck rotate counter-clockwise.

9. The product transport system of claim 3, wherein the self-stabilizing platform assembly further comprises a platform, the pallet, with the product on the deck thereof, being supported, at least in part, by the platform during moving of the self-stabilizing platform assembly and product, and wherein the multiple torque-generating devices are disposed within the platform.

10. The product transport system of claim 9, wherein the multiple torque-generating devices comprise multiple flywheels, each flywheel being driven via a respective motor of multiple independently controllable motors, and the stability control system being configured to control rotational speed of each flywheel of the multiple flywheels via the multiple independently controllable motors.

11. The product transport system of claim 10, wherein the stability control system is configured to adjust rotational speed of the multiple flywheels according to, in part, sensor data of one or more sensors associated with the self-stabilizing platform assembly or the vehicle.

12. The product transport system of claim 9, wherein the platform comprises a rectangular-shaped platform, and the multiple torque-generating devices comprise four torque-generating devices, each torque-generating device of the four torque-generating devices being disposed closest to a respective corner of the rectangular-shaped platform of the self-stabilizing platform assembly.

13. The product transport system of claim 12, wherein the four torque-generating devices comprise four flywheels, and in operation, two flywheels of the four flywheels disposed diagonally in the platform below the deck rotate clockwise, and two other flywheels of the four flywheels disposed diagonally in the platform below the deck rotate counter-clockwise.

14. The product transport system of claim 2, wherein the self-stabilizing platform assembly comprises one or more sensors to provide the stability control system with sensor data to facilitate identifying a tilting of the self-stabilizing platform assembly, the stability control system being configured to adjust operation of the one or more torque-generating devices of the multiple torque-generating devices based, at least in part, on the sensor data of the one or more sensors being indicative of the tiling of the self-stabilizing platform assembly to produce the stabilization torque to counter the tiling of the self-stabilizing platform assembly and product.

15. The product transport system of claim 2, wherein the multiple torque-generating devices each produce a gyroscopic torque in operation, the gyroscopic torques being controlled by the stability control system to product the stabilization torque based, at least in part, on sensor data of the one or more sensors associated with the self-stabilizing platform assembly or the vehicle.

16. A method of fabricating a product transport system comprising:
    providing a self-stabilizing platform assembly configured to support a product on a deck of the self-stabilizing platform assembly and to stabilize the product during moving of the self-stabilizing platform assembly and product, the providing of the self-stabilizing platform assembly comprising:
        operatively positioning multiple torque-generating devices within the self-stabilizing platform assembly, the multiple torque-generating devices being controllable to produce a stabilization torque within the self-stabilizing platform assembly, and the multiple torque-generating devices of the self-stabilizing platform assembly being disposed below the deck to support the product; and providing a stability control system to control operation of the multiple torque-generating devices, the stability control system being configured to adjust operation of one or more torque-generating devices of the multiple torque-generating devices to produce in operation the stabilization torque to facilitate stabilizing the product on the deck during moving of the self-stabilizing platform assembly and product.

17. The method of claim 16, wherein the self-stabilizing platform assembly and product are moved by a vehicle, and providing the self-stabilizing platform assembly further comprises:

providing a pallet, the deck to support the product being a deck of the pallet;

providing the multiple torque-generating devices within the self-stabilizing platform assembly below the deck, the multiple torque-generating devices comprising multiple flywheels, each flywheel being driven via a respective motor of multiple independently controllable motors; and wherein the stability control system is configured to control rotational speed of each flywheel of the multiple flywheels via the multiple independently controllable motors.

18. The method of claim 17, wherein the multiple flywheels are disposed within the pallet below the deck.

19. The method of claim 16, wherein the self-stabilizing platform assembly and product are moved by a vehicle, and the multiple torque-generating devices are disposed within the self-stabilizing platform assembly below the deck, and wherein providing the self-stabilizing platform assembly further comprises:

providing a pallet, with the deck of the self-stabilizing platform assembly being a deck of the pallet, and the multiple torque-generating devices being disposed within the self-stabilizing platform assembly below the deck;

providing a platform, where the pallet, with the product on the deck thereof, is supported, at least in part, by the platform during moving of the self-stabilizing platform assembly and product, and the multiple torque-generating devices are disposed within the platform; and wherein the multiple torque-generating devices comprise multiple flywheels, each flywheel being driven via a respective motor of multiple independently controllable motors, and wherein the stability control system is configured to control rotational speed of each flywheel of the multiple flywheels via the multiple independently controllable motors.

20. The method of claim 16, wherein the self-stabilizing platform assembly and product are moved by a vehicle, and the multiple torque-generating devices are disposed within the self-stabilizing platform assembly below the deck, and wherein providing the self-stabilizing platform assembly further comprises:

providing a pallet, the deck of the self-stabilizing platform assembly being a deck of the pallet, and the multiple torque-generating devices being disposed within the self-stabilizing platform assembly below the deck;

providing a platform, where the pallet, with the product on the deck thereof, is supported, at least in part, by the platform during the moving of the self-stabilizing platform assembly and product, and the multiple torque-generating devices are disposed within the platform; and wherein the platform comprises a rectangular-shaped platform, the multiple torque-generating devices comprising four torque-generating devices, each torque-generating device of the four torque-generating devices being disposed closest to a respective corner of the rectangular-shaped platform of the self-stabilizing platform assembly.

* * * * *